(12) United States Patent
Jonker et al.

(10) Patent No.: US 12,444,144 B2
(45) Date of Patent: Oct. 14, 2025

(54) DESIGNING AND OPTIMIZING ADAPTIVE SHORTCUTS FOR EXTENDED REALITY

(71) Applicant: Meta Platforms Technologies, LLC, Menlo Park, CA (US)

(72) Inventors: Tanya Renee Jonker, Seattle, WA (US); Kashyap Todi, Seattle, WA (US); Joao Marcelo Evangelista Belo, Redmond, WA (US); Felix Izarra, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/497,241

(22) Filed: Oct. 30, 2023

(65) Prior Publication Data

US 2024/0144618 A1 May 2, 2024

Related U.S. Application Data

(60) Provisional application No. 63/381,441, filed on Oct. 28, 2022.

(51) Int. Cl.
*G06T 19/00* (2011.01)
*G06F 3/01* (2006.01)

(52) U.S. Cl.
CPC .......... *G06T 19/006* (2013.01); *G06F 3/011* (2013.01); *G06T 2200/24* (2013.01)

(58) Field of Classification Search
None
See application file for complete search history.

(56) References Cited

U.S. PATENT DOCUMENTS

2021/0248490 A1* 8/2021 Ma .................. G06F 3/0487

* cited by examiner

*Primary Examiner* — Christopher J Kohlman
(74) *Attorney, Agent, or Firm* — Morgan, Lewis & Bockius LLP

(57) ABSTRACT

Disclosed herein is an extended reality system, and associated techniques, whereby personalized usage data of a user in one or more extended reality environments over a period of time can be collected and provided to a predictive model to determine optimal shortcut assignments for presentation to and subsequent use by the user. Determining the optimal shortcut assignments can involve estimating a plurality of interaction times for the user in the one or more extended reality environments, generating an optimized graphical user interface within the one or more extended reality environments with the optimal shortcut assignments reflected in the optimized graphical user interface, and rendering the optimized graphical user interface in the one or more extended reality environments to the user. The system may collect additional personalized usage data and periodically update the optimal shortcut assignments based on ongoing use of the system by the user.

20 Claims, 19 Drawing Sheets

DESIGNING AND OPTIMIZING ADAPTIVE SHORTCUTS FOR EXTENDED REALITY

CROSS-REFERENCES TO RELATED APPLICATIONS

The present application claims the benefit and priority of U.S. Provisional Application No. 63/381,441, filed on Oct. 28, 2022, which is hereby incorporated by reference in its entirety for all purposes.

FIELD

The present disclosure relates generally to shortcuts implemented in an extended reality system, and more particularly, to techniques for designing and optimizing shortcut assignments for the extended reality system.

BACKGROUND

Extended reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Extended reality content may include completely generated virtual content or generated virtual content combined with physical content (e.g., physical or real-world objects). The extended reality content may include digital images or animation, text, video, audio, haptic feedback, or some combination thereof, and any of which may be presented in a single channel or in multiple channels (such as stereo video that produces a three-dimensional effect to the viewer). Extended reality may be associated with applications, products, accessories, services, or some combination thereof, that are, e.g., used to create content in an extended reality and/or used in (e.g., perform activities in) an extended reality. The extended reality system that provides such content may be implemented on various platforms, including a head-mounted display (HMD) connected to a host computer system, a standalone HMD, a mobile device or computing system, or any other hardware platform capable of providing extended reality content to one or more viewers.

Extended reality systems have enormous potential in the manner in which content is provided to users. Typical computing systems provide users with functionality or commands that can be accessed using various mechanisms such as menus, toolbars, and icons to allow a user to interact with content. Given the complexity of these user interfaces (UIs), accessing these commands can require significant time and effort. In such a context, shortcuts can provide simplified methods of accessing the commands. The importance of shortcuts is well understood—underlined as one of Shneiderman's golden design rules. And shortcuts are already so embedded in everyday interactions that they can go unnoticed. For example, shortcuts are ubiquitous in established computing paradigms and devices, as they enable users to select key functionality more efficiently. For example, many operating systems include a central control function (location) that facilitates quick actions. Such central control functions have become so relied on by users, that they frequently replace conventional command execution interactions. Another example of a shortcut where an alternative interaction modality allows a user to more conveniently or effectively interact with content in some scenarios is a voice assistants. Voice assistants allow spoken phrases to activate commands, thereby enhancing user efficiency.

Although, shortcuts are efficient mechanisms for selecting commands using alternate interactions to interact with content, shortcuts are under-explored in the context of extended reality.

BRIEF SUMMARY

Techniques disclosed herein relate generally to determining and implementing optimal shortcut assignments in one or more extended reality environments of an extended reality system through the collection, analysis, and use of personalized usage data of a user in the one or more extended reality environments over a period of time. The collected personalized usage data can be provided to a predictive model to determine the optimal shortcut assignments for presentation to and subsequent use by the user. Determining the optimal shortcut assignments can involve estimating a plurality of interaction times for the user in the one or more extended reality environments, generating an optimized graphical user interface within the one or more extended reality environments with the optimal shortcut assignments reflected in the optimized graphical user interface, and rendering the optimized graphical user interface in the one or more extended reality environments to the user. Estimating a plurality of interaction times may involve the use of a graph, such as an acyclic graph having a plurality of nodes representing different states of an application and various edges representing assigned shortcuts between the nodes. The system may collect updated personalized usage data over the course of ongoing use of the system by the user and can periodically revise the optimal shortcut assignments based on the updated personalized usage data.

According to the techniques disclosed herein, in some embodiments, the predictive model can use collected personalized usage data of a user to optimize shortcut functionality for a user. By this method, a shortcut that may universally exist within a given extended reality environment to allow all users to perform a particular task, the manner in which the shortcut is implemented may nonetheless be customized/optimized based on individual user preferences. For example, a shortcut for playing music may exist for all users in a given extended reality environment. However, according to some embodiments, the shortcut may be customized based on user preference such that execution of the shortcut by one user is accomplished by, e.g., pressing a virtual arm button while execution of the shortcut by a different user is accomplished by, e.g., making a finger-pinch hand gesture. In other embodiments, the system may use a predictive model and collected personalized usage data of a user to not only determine how the user should interact with (execute) a given shortcut, but also what the shortcut is for that user. For example, in some embodiments the predictive model may determine from the personalized usage data of the user, a particular functionality (e.g., call Person A) that is frequently utilized by the user, and may thereafter also assign a particular shortcut to that functionality based on a prediction that the shortcut assignment will be an optimal shortcut assignment for that user to perform the particular functionality (e.g., a right-swipe hand gesture that results in a phone call to Person A is an efficient/low cost interaction for the user). In other words, in some embodiments, the system can determine what interactions are particular/important to a given user and also the best way implement those interactions via the available shortcuts.

In various embodiments, an extended reality system is provided comprising an extended reality device designed to be worn by a user and having a display to display content to the user in an extended reality environment, the extended reality system further including one or more sensors to capture input data including images of a visual field of the user, one or more processors, and one or more memories accessible to the one or more processors, the one or more memories storing a plurality of instructions that are executable by the one or more processors to cause the one or more processors to perform processing comprising: collecting a first set of personalized usage data of the user in one or more extended reality environments over a period of time; providing the first set of personalized usage data to a predictive model; based on the first set of personalized usage data, estimating, by the predictive model, a plurality of interaction times for the user in the one or more extended reality environments, wherein each interaction time is associated with a corresponding functionality that has been used by the user over the period of time; determining, by the predictive model, optimal shortcut assignments based on the first set of personalized usage data and the plurality of interaction times, wherein the optimal shortcut assignments assign shortcuts to execute functionalities in the one or more extended reality environments; generating, by the predictive model, an optimized graphical user interface in the one or more extended reality environments, the optimal shortcut assignments reflected in the optimized graphical user interface; and rendering the optimized graphical user interface in the one or more extended reality environments to the user.

In some embodiments, the extended reality device can be a head-mounted device selected from the group consisting of a mixed reality headset and augmented reality glasses.

In some embodiments, the first set of personalized usage data can include a first set of functionalities that have been used by the user over the period of time, and one or a combination of: a type of each functionality in the set of functionalities; a usage rate of each functionality in the set of functionalities; a usage time of each functionality in the set of functionalities; an environment associated with each functionality in the set of functionalities; and a time to complete a task associated with one or more functionalities in the first set of functionalities; and the corresponding functionalities can be functionalities of the first set of functionalities.

In some embodiments, estimating a plurality of interaction times by the extended reality system can be based on a computing time required to execute a functionality and a learning cost for the user to perform an interaction to trigger the functionality.

In some embodiments, the optimal shortcut assignments can be a set of shortcuts associated with functionalities that minimize the estimated interaction time.

In some embodiments, the optimal shortcut assignments may be determinable by the predictive model using a design space with a plurality of design dimensions and a plurality of design criteria.

In some embodiments, the design dimensions of the design space can comprise visibility, agency, modality, availability, personalization, or a combination thereof; and the design criteria of the design space can comprise performance, convenience, memorability, attention overload, control, learning cost, or a combination thereof.

In some embodiments, the shortcuts can comprise arm button shortcuts, gesture shortcuts, marking menu shortcuts, smart button shortcuts, user-defined automation shortcuts, or any combination thereof.

In some embodiments, the predictive model can employ a genetic algorithm.

In various embodiments, a computer-implemented method is provided comprising: receiving, by one or more processors, from one or more sensors of an extended reality system, input data including a visual field of the user; collecting a first set of personalized usage data of the user in one or more extended reality environments over a period of time; providing the first set of personalized usage data to a predictive model; estimating, by the predictive model, based on the first set of personalized usage data, a plurality of interaction times for the user in the one or more extended reality environments, wherein each interaction time is associated with a corresponding functionality that has been used by the user over the period of time; determining, by the predictive model, optimal shortcut assignments based on the first set of personalized usage data and the plurality of interaction times, wherein the optimal shortcut assignments assign shortcuts to execute functionalities in the one or more extended reality environments; generating, by the predictive model, an optimized graphical user interface in the one or more extended reality environments, the optimal shortcut assignments reflected in the optimized graphical user interface; and rendering the optimized graphical user interface in the one or more extended reality environments to the user.

Some embodiments include a non-transitory computer-readable storage medium containing computer-readable instructions which, when executed by one or more data processors, cause the one or more data processors to perform part or all of one or more methods and/or part or all of one or more processes disclosed herein.

Some embodiments include a computer-program product tangibly embodied in a non-transitory computer-readable storage medium, the computer-program product including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

Figure 1:
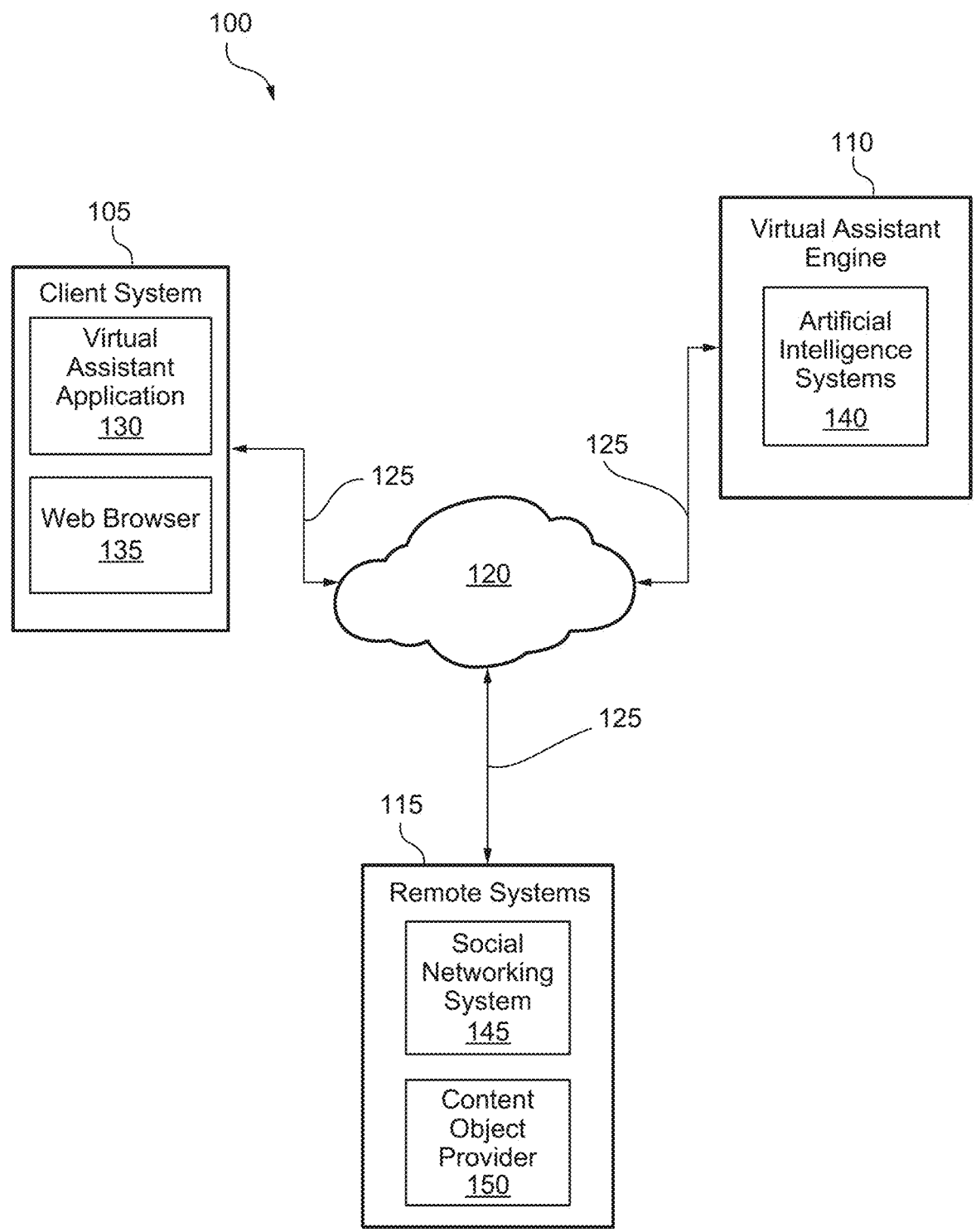
FIG. 1 is a simplified block diagram of a network environment in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

DETAILED DESCRIPTION

Extended reality systems are becoming increasingly ubiquitous with applications in many fields such as computer gaming, health and safety, industrial, and education. As a few examples, extended reality systems are being incorporated into mobile devices, gaming consoles, personal computers, movie theaters, and theme parks. Typical extended reality systems include one or more devices for rendering and displaying content to users. As one example, an extended reality system may incorporate an HMD worn by a user and configured to output extended reality content to the user. The extended reality content may be generated in a wholly or partially simulated environment (extended reality environment) that people sense and/or interact with via an electronic system. The simulated environment may be a VR environment, which is designed to be based entirely on computer-generated sensory inputs (e.g., virtual content) for one or more user senses, or a MR environment, which is designed to incorporate sensory inputs (e.g., a view of the physical surroundings) from the physical environment, or a representation thereof, in addition to including computer-generated sensory inputs (e.g., virtual content). Examples of MR include AR and augmented virtuality (AV). An AR environment is a simulated environment in which one or more virtual objects are superimposed over a physical environment, or a representation thereof, or a simulated environment in which a representation of a physical environment is transformed by computer-generated sensory information. An AV environment refers to a simulated environment in which a virtual or computer-generated environment incorporates one or more sensory inputs from the physical environment. In any instance—VR. MR, AR, or VR, during operation, the user typically interacts with the extended reality system to interact with extended reality content.

Extended reality (XR) systems can be used to facilitate interactions amongst users and objects within the virtual and/or physical world. For example, interfaces such as AR and VR glasses and HMDs have been developed to allow users to interact with spatial computing devices. One way of facilitating these interactions is via shortcuts—i.e., efficient mechanisms for selecting commands using alternate interactions. Shortcut assignment in personal computers (PCs) and smartphones is typically static and defined by creators, and can sometimes be customized by end-users. This approach might be reasonable in devices where interactions are limited to specific input methods such as a mouse, keyboard, or touchscreen. However, designing and assigning shortcuts in extended reality systems requires a different approach. Firstly, shortcut usage is optional because default interaction mechanisms are performant. Therefore, it is not uncommon for users to not adopt or use shortcuts. Secondly, environments in extended reality systems are diverse and may be virtual or physical, which extends the range of shortcuts available in an interactive extended reality system and increases the difficulty in design and assignment of shortcuts. Thirdly, typical interactions in emerging technologies such as extended reality can be demanding from the user perspective, especially for sporadic interactions in everyday scenarios. Lastly, user goals in extended reality can be highly context-dependent and there may be significant variance across users. Thus, the static design inherent to typical shortcuts is not well-suited to extended reality. Other challenges related to designing shortcuts in an extended reality system include, for example, assigning shortcuts that are easy to remember and execute, ensuring that shortcuts do not interfere with other interactions, and consideration of the physical environment of the user.

In order overcome these challenges and others, techniques are described herein for designing and assigning optimal extended reality shortcuts using a predictive model. The techniques relate to a design space for creating shortcut interactions in an extended reality system, whereby optimal, low-friction extended reality system interactions can be achieved by considering key characteristics such as visibility, availability, agency, modality, and personalization. Achieving low-friction interaction in extended reality via shortcuts requires understanding how different design dimensions affect usability. Techniques disclosed herein consider factors such as user preferences, past interactions, and available input methods to seamlessly, efficiently, and flexibly assign shortcuts. The techniques disclosed herein provide user-based and extended reality system-based shortcuts that have been demonstrated to reduce the overall interaction time of a user when compared to a heuristic-based baseline approach to shortcut assignment. The techniques disclosed herein also provide a systematic approach for adaptive shortcut assignments that have been demonstrated to improve user performance in comparison to an extended reality system where no shortcuts are used and in comparison to an extended reality system where shortcuts are assigned according to the baseline approach.

In an exemplary embodiment, an extended reality system is provided comprising: a head-mounted device comprising a display to display content to a user, one or more sensors to capture input data including images of a visual field of the user; one or more processors; and one or more memories accessible to the one or more processors, the one or more memories storing a plurality of instructions executable by the one or more processors, the plurality of instructions comprising instructions that when executed by the one or more processors cause the one or more processors to perform processing comprising: collecting a first set of personalized usage data of the user in one or more extended reality environments over a period of time, wherein the first set of personalized usage data comprise a first set of functionalities that have been used by the user over the period of time, a type of each functionality in the set of functionalities, a usage rate of each functionality in the set of functionalities, a usage time of each functionality in the set of functionalities, an environment associated with each functionality in the set of functionalities, a time to complete a task associated with one or more functionalities in the first set of functionalities, or any combination thereof; estimating a plurality of interaction times for the user in the one or more extended reality environments, wherein each interaction time is associated with a functionality in the set of functionalities that have been used by the user over the period of time; determining optimal shortcut assignments based on the first set of personalized usage data and the plurality of interaction times, wherein the optimal shortcut assignments assign shortcuts to execute functionalities in the one or more extended reality environments; optimizing a graphical user interface in the one or more extended reality environments based on the optimal shortcut assignments; and rendering the graphical user interface in the one or more extended reality environments to the user. The identifying generates new mutations of an interaction graph by varying the assignment of shortcuts to commands and selecting an optimal solution as one where shortcut assignments minimize an average interaction time with the extended reality system.

In some embodiments, user feedback about different shortcuts in the extended reality system is collected. The above-referenced heuristic-based baseline approach that assigns shortcuts based on how much time the user spends to complete commands can be adopted for comparison. In general, it has been found that the disclosed techniques achieve in excess of a 25% reduction in average interaction time by using the design space, and demonstrate a 29% performance improvement over a condition with no shortcuts and a 12% improvement over the baseline approach.

As used herein, the term "idle" may refer to a state or a processor of a system, a program, or an environment when it is not actively processing tasks or user input.

As used herein, the term "design space" may refer to an environment or a physical space in an extended reality system. The terms "design space" and "environment" may be used interchangeably.

As used herein, the term "environment" or "extended reality environment" may refer to a digital or virtual space that is created by the extended reality system. The term "environment" or "extended reality environment" may also refer to partially physical or a physical space where digital information is overlaid onto it which enables a user to interact with the digital information. The term "environment" or "extended reality environment" may refer to a mix of digital, virtual, partially physical, and physical environments.

As used herein, the term "functionality," "command," or "action" may refer to the capabilities and features of an extended reality system that enable the extended reality system to provide an immersive experience to a user. Examples of functionalities or commands include but are not limited to tracking, navigating, rendering, modeling, mapping, scrolling, clicking, interaction, collaboration, immersion, simulation, recognition, feedback, and content creation. A state of an extended reality system may be referred to as a functionality or a null functionality. The term "functionality" may be used interchangeably with "interaction" or "action."

As used herein, the terms "hand pose" and "gesture" may be used interchangeably. The terms "hand pose" and "gesture" are intended to describe a motion or status generated using hands, or using another part of a human body. For example, a kicking motion using one foot may be referred to herein as a "hand pose" or a "gesture" despite not involving a hand.

As used herein, the term "usage rate of a functionality" refers to the frequency of use of the functionality. The frequency may be evaluated in a predetermined time interval, or a sub-interval of the predetermined time interval. The frequency may also be normalized across functionalities, across shortcuts or types of shortcuts, or across users.

As used herein, the term "a task associated with a functionality" may refer to an aim of a user to be achieved using the functionality. For example, a task may be to play a specific song, and an associated functionality is to open a music application. A task may be associated with more than one functionality. The term "task" may be used interchangeably with "functionality" or "command." The term "associated" may be used interchangeably with "mapped."

As used herein, the term "time" may refer to an actual interaction time or a cost associated with the interaction. The cost may comprise a time cost and/or a cognitive cost.

1. Extended Reality System Overview

FIG. 1 illustrates an example network environment 100 associated with an extended reality system in accordance with aspects of the present disclosure. The network environment 100 includes a client system 105, a virtual assistant engine 110, and remote systems 115 connected to each other by a network 120. Although FIG. 1 illustrates a particular arrangement of a client system 105, a virtual assistant engine 110, remote systems 115, and a network 120, this disclosure contemplates any suitable arrangement of a client system 105, a virtual assistant engine 110, remote systems 115, and a network 120. As an example, and not by way of limitation, two or more of a client system 105, a virtual assistant engine 110, and remote systems 115 may be connected to each other directly, bypassing network 120. As another example, two or more of a client system 105, a virtual assistant engine 110, and remote systems 115 may be physically or logically co-located with each other in whole or in part. Moreover, although FIG. 1 illustrates a particular number of a client system 105, a virtual assistant engine 110, remote systems 115, and networks 120, this disclosure contemplates any suitable number of client systems 105, virtual assistant engines 110, remote systems 115, and networks 120. As an example, and not by way of limitation, network environment 100 may include multiple client systems 105, virtual assistant engines 110, remote systems 115, and networks 120.

This disclosure contemplates any suitable network 120. As an example and not by way of limitation, one or more portions of a network 120 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 120 may include one or more networks 120.

Links 125 may connect a client system 105, a virtual assistant engine 110, and remote systems 115 to a communication network or to each other. This disclosure contemplates any suitable links 125. In particular embodiments, one or more links 125 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 125 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 125, or a combination of two or more such links 125. Links 125 need not necessarily be the same throughout a network environment 100. One or more first links 125 may differ in one or more respects from one or more second links 125.

In various embodiments, a client system 105 is an electronic device including hardware, software, or embedded logic components or a combination of two or more such components and capable of carrying out the appropriate extended reality functionalities in accordance with techniques of the disclosure. As an example, and not by way of limitation, a client system 105 may include a desktop computer, notebook or laptop computer, netbook, a tablet computer, e-book reader, GPS device, camera, personal digital assistant (PDA), handheld electronic device, cellular telephone, smartphone, a VR. MR, AR, or VR headset such as an AR/VR HMD, other suitable electronic devices capable of displaying extended reality content, or any suitable combination thereof. In particular embodiments, the client system 105 is an AR/VR HMD as described in detail with respect to FIG. 2. This disclosure contemplates any suitable client system 105 configured to generate and output extended reality content to the user. The client system 105 may enable its user to communicate with other users at other client systems 105.

In various embodiments, the client system 105 includes a virtual assistant application 130. The virtual assistant application 130 instantiates at least a portion of the virtual assistant, which can provide information or services to a user based on a combination of user input, contextual awareness (such as clues from the physical environment or clues from user behavior), and the capability to access information from a variety of online sources (such as weather conditions, traffic information, news, stock prices, user schedules, retail prices, etc.). The user input may include text (e.g., online chat), especially in an instant messaging application or other applications, voice, eye-tracking, user motion such as gestures or running, or a combination of them. The virtual assistant may perform concierge-type services (e.g., making dinner reservations, purchasing event tickets, making travel arrangements, and the like), provide information (e.g., reminders, information concerning an object in an environment, information concerning a task or interaction, answers to questions, training regarding a task or activity, and the like), goal assisted services (e.g., generating and implementing an exercise regimen to achieve a certain level of fitness or weight loss, implementing electronic devices such as lights, heating, ventilation, and air conditioning systems, coffee maker, television, etc., generating and executing a morning routine such as wake up, get ready for work, make breakfast, and travel to work, and the like), or combinations thereof. The virtual assistant may also perform management or data-handling tasks based on online information and events without user initiation or interaction. Examples of those tasks that may be performed by a virtual assistant may include schedule management (e.g., sending an alert to a dinner date that a user is running late due to traffic conditions, update schedules for both parties, and change the restaurant reservation time). The virtual assistant may be enabled in an extended reality environment by a combination of the client system 105, the virtual assistant engine 110, application programming interfaces (APIs), and the proliferation of applications on user devices such as the remote systems 115.

A user at the client system 105 may use the virtual assistant application 130 to interact with the virtual assistant engine 110. In some instances, the virtual assistant application 130 is a stand-alone application or may be integrated into another application such as a social-networking application or another suitable application (e.g., an artificial simulation application). In some instances, the virtual assistant application 130 is integrated into the client system 105 (e.g., part of the operating system of the client system 105), an assistant hardware device, or any other suitable hardware devices. In some instances, the virtual assistant application 130 may be accessed via a web browser 135. In some instances, the virtual assistant application 130 passively listens to and watches interactions of the user in the real-world, and processes what it hears and sees (e.g., explicit input such as audio commands or interface commands, contextual awareness derived from audio or physical actions of the user, objects in the real-world, environmental triggers such as weather or time, and the like) in order to interact with the user in an intuitive manner.

In particular embodiments, the virtual assistant application 130 receives or obtains input from a user, the physical environment, a virtual reality environment, or a combination thereof via different modalities. As an example, and not by way of limitation, the modalities may include audio, text, image, video, motion, graphical or virtual user interfaces, orientation, sensors, etc. The virtual assistant application 130 communicates the input to the virtual assistant engine 110. Based on the input, the virtual assistant engine 110 analyzes the input and generates responses (e.g., text or audio responses, device commands such as a signal to turn on a television, virtual content such as a virtual object, or the like) as output. The virtual assistant engine 110 may send the generated responses to the virtual assistant application 130, the client system 105, the remote systems 115, or a combination thereof. The virtual assistant application 130 may present the response to the user at the client system 105 (e.g., rendering virtual content overlaid on a real-world object within the display). The presented responses may be based on different modalities such as audio, text, image, and video. As an example, and not by way of limitation, context concerning activity of a user in the physical world may be analyzed and determined to initiate an interaction for completing an immediate task or goal, which may include the virtual assistant application 130 retrieving traffic information (e.g., via a remote system 115). The virtual assistant application 130 may communicate the request for "traffic information" to the virtual assistant engine 110. The virtual assistant engine 110 may accordingly contact a remote system 115 and retrieve traffic information as a result of the request, and subsequently send the retrieved traffic information back to the virtual assistant application 130. The virtual assistant application 130 may then present the traffic information to the user as text (e.g., as virtual content overlaid on the physical environment such as a real-world object) or audio (e.g., spoken to the user in natural language through a speaker associated with the client system 105).

In various embodiments, the virtual assistant engine 110 assists users to retrieve information from various sources, request services from different service providers, assist users to learn or complete goals and tasks using various sources and/or service providers, and combinations thereof. In some instances, the virtual assistant engine 110 receives input data from the virtual assistant application 130 and determines one or more interactions based on the input data that could be executed to request information, services, and/or complete a goal or task of the user. The interactions are actions that could be presented to a user for execution in an extended reality environment. In some instances, the interactions are influenced by other actions associated with the user. The interactions are aligned with goals or tasks associated with the user. The goals may comprise, for example, long term goals such as being fit, intermediate goals such as completing a weekly exercise challenge, and immediate goals such as completing today's exercise regimen. Each goal may be associated with a workflow of actions or tasks for achieving the goal. For example, for today's exercise regimen, the workflow of actions or tasks may comprise possible classes or programs for completing today's exercise regimen, the individual exercises to be performed for the classes or programs, the repetition, sets, and/or time associated with performing each exercise, and any equipment need for each of the exercises.

The virtual assistant engine 110 may use artificial intelligence systems 140 (e.g., rule-based systems or machine-learning based systems such as natural-language understanding models) to analyze the input based on a user's profile and other relevant information. The result of the analysis may comprise different interactions associated with a task or goal of the user. The virtual assistant engine 110 may then retrieve information, request services, and/or generate instructions, recommendations, or virtual content associated with one or more of the different interactions for completing tasks or goals. In some instances, the virtual assistant engine 110 interacts with a remote system 115 such as a social-networking system 145 when retrieving information, requesting service, and/or generating instructions or recommendations for the user. The virtual assistant engine 110 may generate virtual content for the user using various techniques such as natural-language generating, virtual object rendering, and the like. The virtual content may comprise, for example, the retrieved information, the status of the requested services, a virtual object such as a glimmer overlaid on a physical object such as a bicycle, light, or yoga mat, a modeled pose for an exercise, and the like. In particular embodiments, the virtual assistant engine 110 enables the user to interact with it regarding the information, services, or goals using a graphical or virtual interface, a stateful and multi-turn conversation using dialog-management techniques, and/or a stateful and multi-action interaction using task-management techniques.

In various embodiments, a remote system 115 may include one or more types of servers, one or more data stores, one or more interfaces, including but not limited to APIs, one or more web services, one or more content sources, one or more networks, or any other suitable components, e.g., that servers may communicate with. A remote system 115 may be operated by a same entity or a different entity from an entity operating the virtual assistant engine 110. In particular embodiments, however, the virtual assistant engine 110 and third-party remote systems 115 may operate in conjunction with each other to provide virtual content to users of the client system 105. For example, a social-networking system 145 may provide a platform, or backbone, which other systems, such as third-party systems, may use to provide social-networking services and functionality to users across the Internet, and the virtual assistant engine 110 may access these systems to provide virtual content on the client system 105.

In particular embodiments, the social-networking system 145 may be a network-addressable computing system that can host an online social network. The social-networking system 145 may generate, store, receive, and send social-networking data, such as, for example, user-profile data, concept-profile data, social-graph information, or other suitable data related to the online social network. The social-networking system 145 may be accessed by the other components of network environment 100 either directly or via a network 120. As an example, and not by way of limitation, a client system 105 may access the social-networking system 145 using a web browser 135, or a native application associated with the social-networking system 145 (e.g., a mobile social-networking application, a messaging application, another suitable application, or any combination thereof) either directly or via a network 120. The social-networking system 145 may provide users with the ability to take actions on various types of items or objects, supported by the social-networking system 145. As an example, and not by way of limitation, the items and objects may include groups or social networks to which users of the social-networking system 145 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 145 or by an external system of the remote systems 115, which is separate from the social-networking system 145 and coupled to the social-networking system 145 via the network 120.

The remote system 115 may include a content object provider 150. A content object provider 150 includes one or more sources of virtual content objects, which may be communicated to the client system 105. As an example, and not by way of limitation, virtual content objects may include information regarding things or activities of interest to the user, such as, for example, movie show times, movie reviews, restaurant reviews, restaurant menus, product information and reviews, instructions on how to perform various tasks, exercise regimens, cooking recipes, or other suitable information. As another example, and not by way of limitation, content objects may include incentive content objects, such as coupons, discount tickets, gift certificates, or other suitable incentive objects. As another example, and not by way of limitation, content objects may include virtual objects such as virtual interfaces, 2D or 3D graphics, media content, or other suitable virtual objects.

Figure 2A:
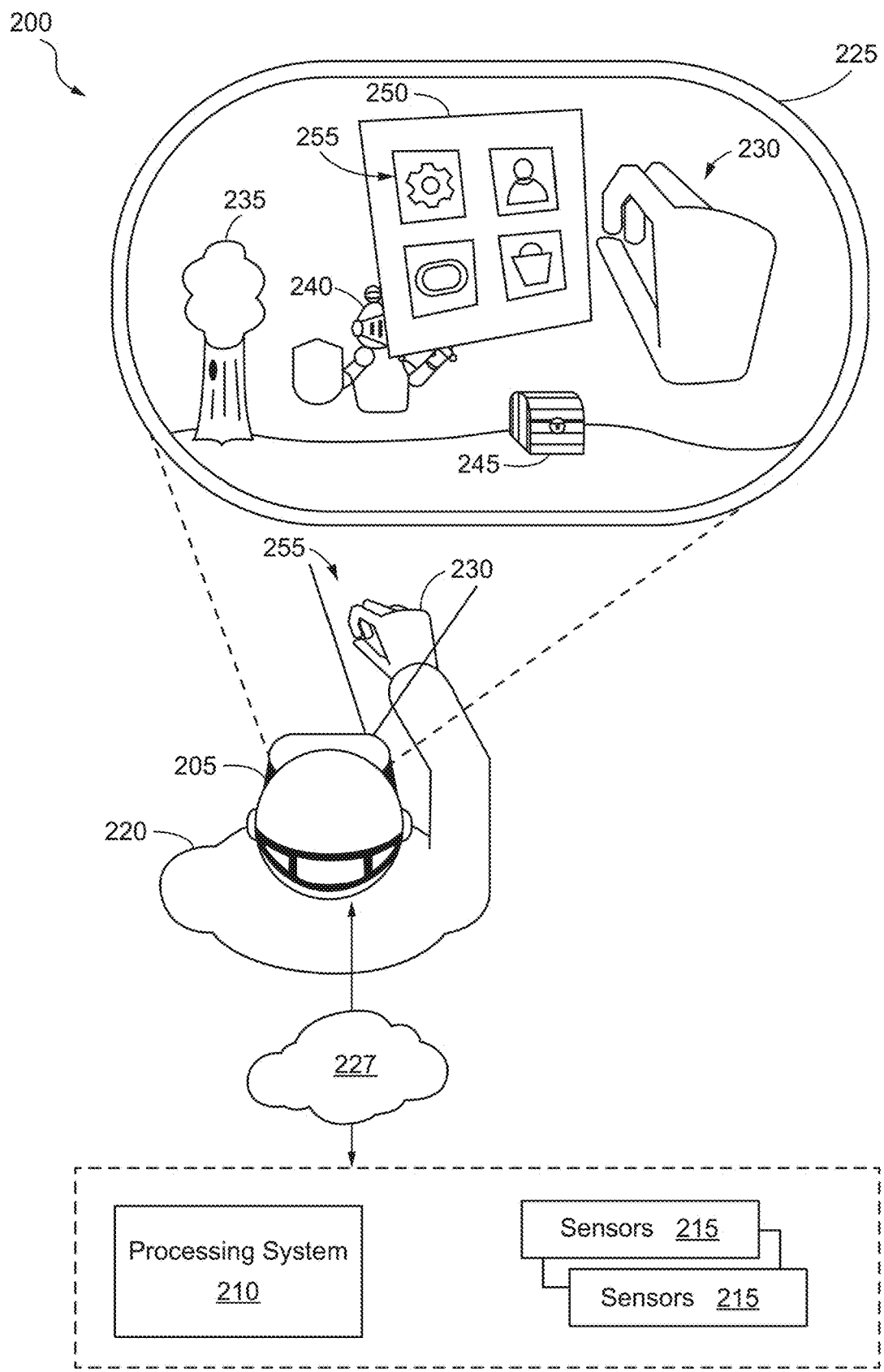
FIG. 2A is an illustration depicting an example extended reality system that presents and controls user interface elements within an extended reality environment in accordance with various embodiments.

FIG. 2A illustrates an example of a client system 200 (e.g., client system 105 described with respect to FIG. 1) in accordance with aspects of the present disclosure. Client system 200 includes an extended reality system 205 (e.g., a HMD), a processing system 210, and one or more sensors 215. As shown, the extended reality system 205 is typically worn by a user 220 and comprises an electronic display (e.g., a transparent, translucent, or solid display), optional controllers, and an optical assembly for presenting extended reality content 225 to the user 220. The one or more sensors 215 may include motion sensors (e.g., accelerometers) for tracking motion of the extended reality system 205 and may include one or more image capture devices (e.g., cameras, line scanners) for capturing image data of the surrounding physical environment. In this example, the processing system 210 is shown as a single computing device, such as a gaming console, a workstation, a desktop computer, or a laptop. In other examples, the processing system 210 may be distributed across a plurality of computing devices, such as a distributed computing network, a data center, or a cloud computing system. In other examples, the processing system 210 may be integrated with the HMD 205. The extended reality system 205, the processing system 210, and the one or more sensors 215 are communicatively coupled via a network 227, which may be a wired or wireless network, such as Wi-Fi, a mesh network, a short-range wireless communication medium such as Bluetooth wireless technology, or a combination thereof. Although the extended reality system 205 is shown in this example as in communication with, e.g., tethered to or in wireless communication with, the processing system 210, in some implementations the extended reality system 205 operates as a stand-alone, mobile extended reality system.

In general, the client system 200 uses information captured from a real-world, physical environment to render extended reality content 225 for display to the user 220. In the example of FIG. 2, the user 220 views the extended reality content 225 constructed and rendered by an extended reality application executing on the processing system 210 and/or the extended reality system 205. In some examples, the extended reality content 225 viewed through the extended reality system 205 comprises a mixture of real-world imagery (e.g., the user's hand 230 and physical objects 235) and virtual imagery (e.g., virtual content such as information or objects 240, 245 and a virtual user interface 250) to produce mixed reality and/or augmented reality. In some examples, virtual information or objects 240, 245 may be mapped (e.g., pinned, locked, placed) to a particular position within the extended reality content 225. For example, a position for virtual information or objects 240, 245 may be fixed, as relative to a wall of a residence or the surface of the earth, for instance. A position for virtual information or objects 240, 245 may instead be variable, as relative to a physical object 235 or the user 220, for instance. In some examples, the particular position of virtual information or objects 240, 245 within the extended reality content 225 is associated with a position within the real world, physical environment (e.g., on a surface of a physical object 235).

In the example shown in FIG. 2A, virtual information or objects 240, 245 are mapped at a position relative to a physical object 235. As should be understood, the virtual imagery (e.g., virtual content such as information or objects 240, 245 and virtual user interface 250) does not exist in the real-world, physical environment. The virtual user interface 250 may be fixed, as relative to the user 220, the user's hand 230, physical objects 235, or other virtual content such as virtual information or objects 240, 245, for instance. As a result, the client system 200 renders, at a user interface position that is locked relative to a position of the user 220, the user's hand 230, physical objects 235, or other virtual content in the extended reality environment, the virtual user interface 250 for display at extended reality system 205 as part of extended reality content 225. As used herein, a virtual element 'locked' to a position of virtual content or a physical object is rendered at a position relative to the position of the virtual content or physical object so as to appear to be part of or otherwise tied in the extended reality environment to the virtual content or the physical object.

In some implementations, the client system 200 generates and renders virtual content (e.g., GIFs, photos, applications, live-streams, videos, text, a web-browser, drawings, animations, representations of data files, or any other visible media) on a virtual surface. A virtual surface may be associated with a planar or other real-world surface (e.g., the virtual surface corresponds to and is locked to a physical surface, such as a wall table, or ceiling). In the example shown in FIG. 2A, the virtual surface is associated with the sky and ground of the physical environment. In other examples, a virtual surface can be associated with a portion of a real-world surface (e.g., a portion of the wall). In some examples, only the virtual content items contained within a virtual surface are rendered. In other examples, the virtual surface is generated and rendered (e.g., as a virtual plane or as a border corresponding to the virtual surface). In some examples, a virtual surface can be rendered as floating in a virtual or real-world physical environment (e.g., not associated with a particular real-world surface). The client system 200 may render one or more virtual content items in response to a determination that at least a portion of the location of virtual content items is in a field of view of the user 220. For example, the client system 200 may render the virtual user interface 250 only if a given physical object (e.g., a lamp) is within the field of view of the user 220.

During operation, the extended reality application constructs extended reality content 225 for display to the user 220 by tracking and computing interaction information (e.g., yoga pose information) for a frame of reference, typically a viewing perspective of the extended reality system 205. Using the extended reality system 205 as a frame of reference, and based on a current field of view as determined by a current estimated interaction of the extended reality system 205, the extended reality application renders extended reality content 225 which, in some examples, may be overlaid, at least in part, upon the real-world, physical environment of the user 220. During this process, the extended reality application uses sensed data received from the extended reality system 205 and the sensors 215, such as movement information, contextual awareness, and/or user commands. In some examples, the extended reality system 205 may also use data from any external sensors, such as third-party information or devices, to capture information within the real world, physical environment, such as motion by the user 220 and/or feature tracking information with respect to the user 220. Based on the sensed data, the extended reality application determines interaction information to be presented for the frame of reference of the extended reality system 205 and, in accordance with the current context of the user 220, renders the extended reality content 225.

The client system 200 may trigger generation and rendering of virtual content based on a current field of view of the user 220, as may be determined by real-time gaze 255 tracking of the user, or other conditions. More specifically, image capture devices of the sensors 215 capture image data representative of objects in the real world, physical environment that are within a field of view of image capture devices. During operation, the client system 200 performs object recognition within image data captured by the image capture devices of the extended reality system 205 to identify objects in the physical environment such as the user 220, the user's hand 230, and/or physical objects 235. Further, the client system 200 tracks the position, orientation, and configuration of the objects in the physical environment over a sliding window of time. Field of view typically corresponds with the viewing perspective of the extended reality system 205. In some examples, the extended reality application presents extended reality content 225 comprising mixed reality and/or augmented reality.

As illustrated in FIG. 2A, the extended reality application may render virtual content, such as virtual information or objects 240, 245 on a transparent display such that the virtual content is overlaid on real-world objects, such as the portions of the user 220, the user's hand 230, and/or physical objects 235, that are within a field of view of the user 220. In other examples, the extended reality application may render images of real-world objects, such as the portions of the user 220, the user's hand 230, and/or physical objects 235, that are within a field of view along with virtual objects, such as virtual information or objects 240, 245 within extended reality content 225. In other examples, the extended reality application may render virtual representations of the portions of the user 220, the user's hand 230, and/or physical objects 235 that are within field of view (e.g., render real-world objects as virtual objects) within extended reality content 225. In any case, the user 220 is able to view the portions of the user 220, the user's hand 230, the physical objects 235 and/or any other real-world objects or virtual content that are within field of view within the extended reality content 225. In other examples, the extended reality application may not render representations of the user 220 and the user's hand 230, but instead, render only the physical objects 235 and/or the virtual information or objects 240, 245.

In various embodiments, the client system 200 renders to the extended reality system 205, extended reality content 225 in which the virtual user interface 250 is locked relative to a position of the user 220, the user's hand 230, the physical objects 235, or other virtual content in the extended reality environment. That is, the client system 205 may render the virtual user interface 250 having one or more virtual user interface elements at a position and orientation that is based on and corresponds to the position and orientation of the user 220, the user's hand 230, the physical objects 235, or other virtual content in the extended reality environment. For example, if a physical object is positioned in a vertical position on a table, the client system 200 may render the virtual user interface 250 at a location corresponding to the position and orientation of the physical object in the extended reality environment. Alternatively, if the user's hand 230 is within the field of view, the client system 200 may render the virtual user interface at a location corresponding to the position and orientation of the user's hand 230 in the extended reality environment. Alternatively, if other virtual content is within the field of view, the client system 200 may render the virtual user interface at a location corresponding to a general predetermined position of the field of view (e.g., a bottom of the field of view) in the extended reality environment. Alternatively, if other virtual content is within the field of view, the client system 200 may render the virtual user interface at a location corresponding to the position and orientation of the other virtual content in the extended reality environment. In this way, the virtual user interface 250 being rendered in the virtual environment may track the user 220, the user's hand 230, the physical objects 235, or other virtual content such that the user interface appears, to the user, to be associated with the user 220, the user's hand 230, the physical objects 235, or other virtual content in the extended reality environment.

Figure 2B:
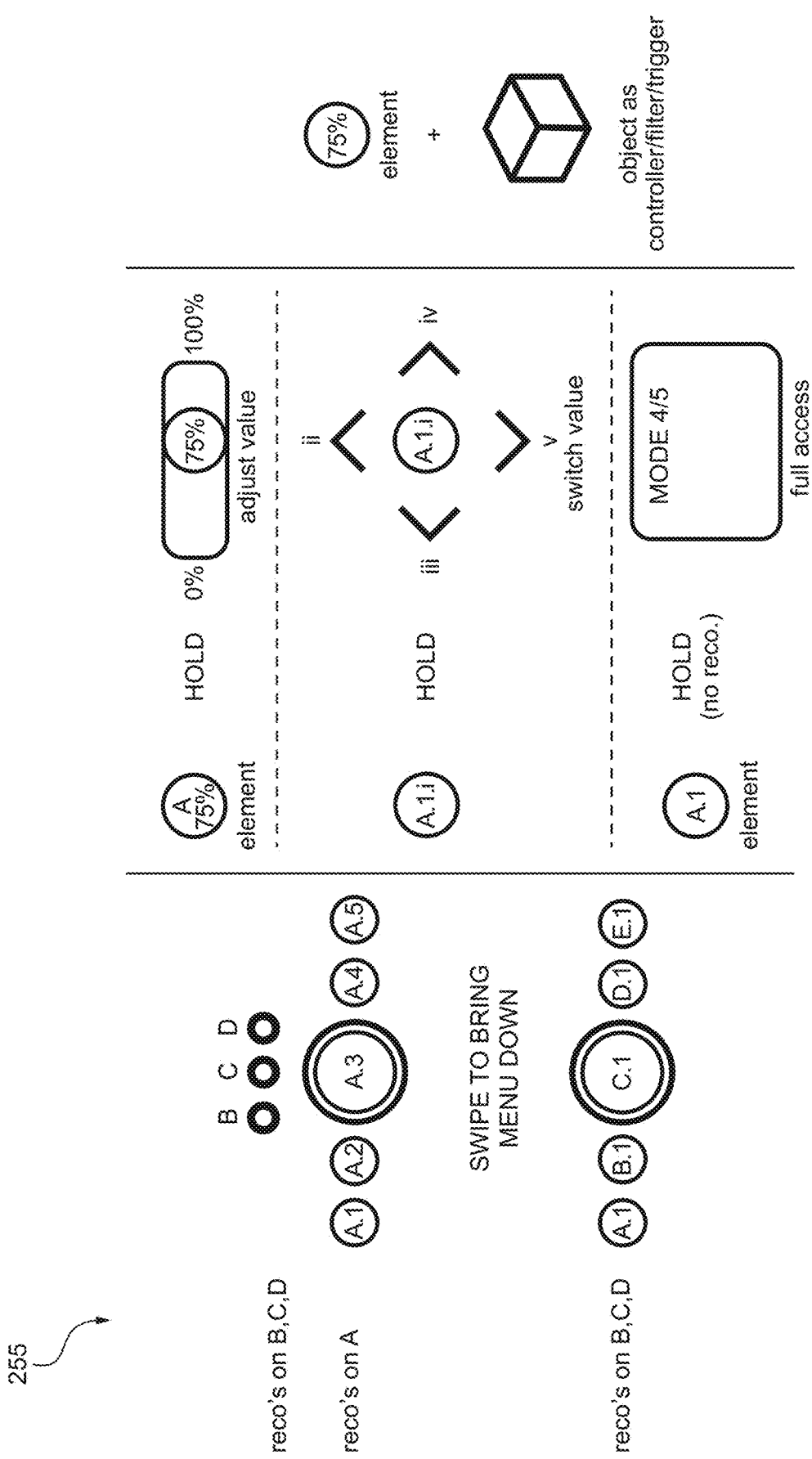
FIG. 2B is an illustration depicting user interface elements in accordance with various embodiments.

The virtual user interface 250 includes one or more virtual user interface elements 255, as shown in FIG. 2B. Virtual user interface elements 255 may include, for instance, a virtual drawing interface, a selectable menu (e.g., a drop-down menu), virtual buttons, a virtual slider or scroll bar, a directional pad, a keyboard, or other user-selectable user interface elements, glyphs, display elements, content, user interface controls, and so forth. The particular virtual user interface elements 255 for the virtual user interface 250 may be context-driven based on the current extended reality applications with which the user 220 is engaged or real-world actions/tasks being performed by the user 220. When a user performs a user interface gesture in the extended reality environment at a location that corresponds to one of the virtual user interface elements 255 of the virtual user interface 250, the client system 200 detects the gesture relative to the virtual user interface elements 255 and performs an action associated with the gesture and the virtual user interface elements 255. For example, the user 220 may gesture a finger press at a button element 255 location on the virtual user interface 250. The button element 255 and/or the virtual user interface 250 location may or may not be overlaid on the user 220, the user's hand 230, the physical objects 235, or other virtual content, e.g., correspond to a position in the physical environment such as on a light switch or controller at which the client system 200 renders the virtual user interface button. In this example, the client system 200 detects the virtual button press gesture and performs an action corresponding to the detected virtual button press (e.g., turns on a light). The client system 200 may also, for instance, animate a press of the virtual user interface button along with the button press gesture.

The client system 200 may detect user interface gestures and other gestures using an inside-out or outside-in tracking system of image capture devices and or external cameras. The client system 200 may alternatively, or in addition, detect user interface gestures and other gestures using a presence-sensitive surface. That is, a presence-sensitive interface of the extended reality system 205 and/or controller may receive user inputs that make up a user interface gesture. The extended reality system 205 and/or controller may provide haptic feedback to touch-based user interaction by having a physical surface with which the user can interact (e.g., touch, drag a finger across, grab, and so forth). In addition, peripheral extended reality system 205 and/or controller may output other indications of user interaction using an output device. For example, in response to a detected press of a virtual user interface button, the extended reality system 205 and/or controller may output a vibration or "click" noise, or the extended reality system 205 and/or controller may generate and output content to a display. In some examples, the user 220 may press and drag their finger along physical locations on the extended reality system 205 and/or controller corresponding to positions in the virtual environment at which the client system 200 renders the virtual user interface elements 255 of the virtual user interface 250. In this example, the client system 200 detects this gesture and performs an action according to the detected press and drag of the virtual user interface elements 255, such as by moving a slider bar in the virtual environment. In this way, client system 200 simulates movement of virtual content using the virtual user interface elements 255 and gestures.

Various embodiments disclosed herein may include or be implemented in conjunction with various types of extended reality systems. Extended reality content generated by the extended reality systems may include completely computer-generated content or computer-generated content combined with captured (e.g., real-world) content. The extended reality content may include video, audio, haptic feedback, or some combination thereof, any of which may be presented in a single channel or in multiple channels (such as stereo video that produces a three-dimensional (3D) effect to the viewer). Additionally, in some embodiments, extended reality may also be associated with applications, products, accessories, services, or some combination thereof, that are used to, for example, create content in an extended reality and/or are otherwise used in (e.g., to perform activities in) an extended reality.

The extended reality systems may be implemented in a variety of different form factors and configurations. Some extended reality systems may be designed to work without near-eye displays (NEDs). Other extended reality systems may include an NED that also provides visibility into the real world (such as, e.g., augmented reality system 300 in FIG. 3A) or that visually immerses a user in an extended reality (such as, e.g., virtual reality system 350 in FIG. 3B). While some extended reality devices may be self-contained systems, other extended reality devices may communicate and/or coordinate with external devices to provide an extended reality experience to a user. Examples of such external devices include handheld controllers, mobile devices, desktop computers, devices worn by a user, devices worn by one or more other users, and/or any other suitable external system.

Figure 3A:
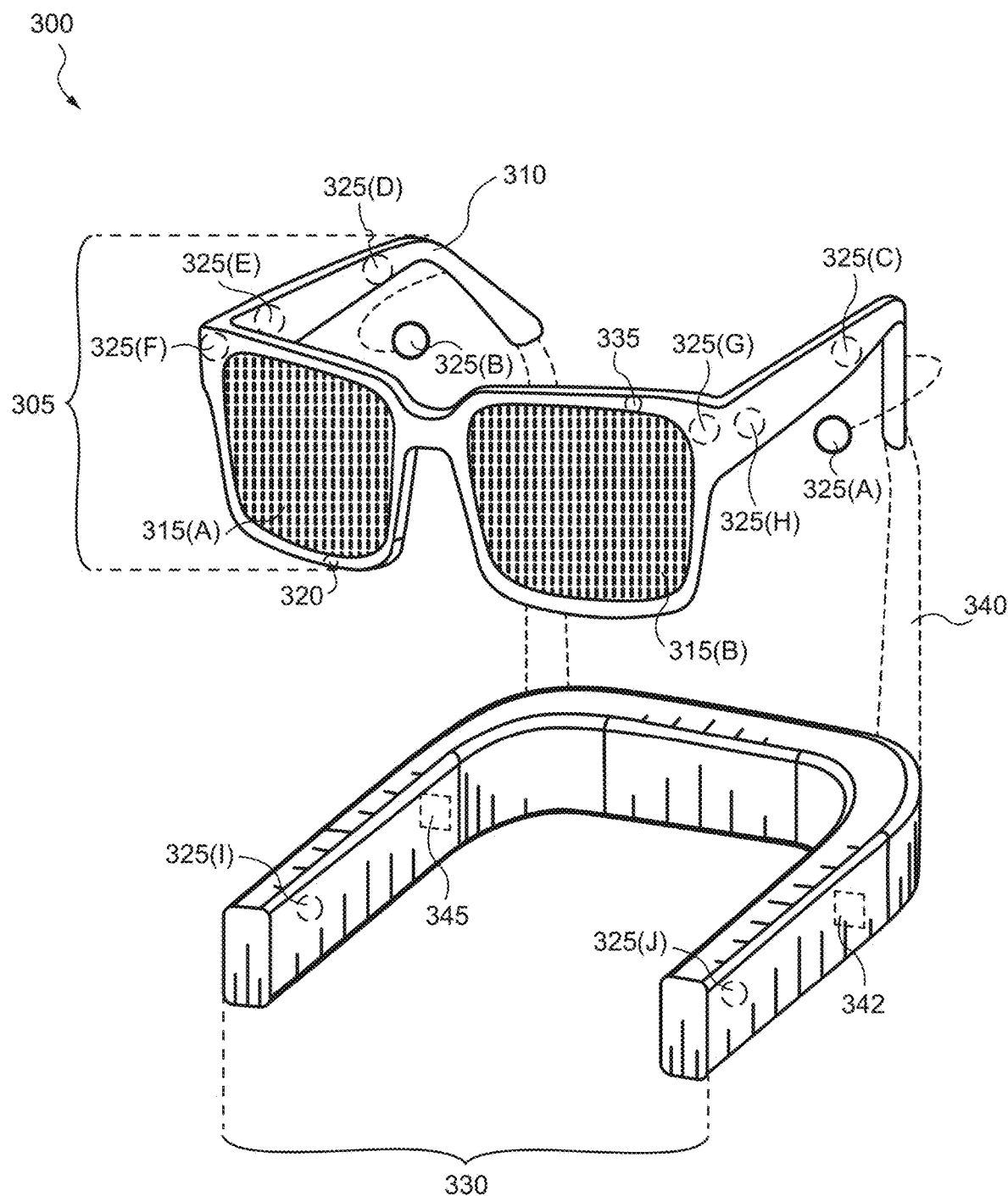
FIG. 3A is an illustration of an augmented reality system in accordance with various embodiments.

As shown in FIG. 3A, an augmented reality system 300 may include an eyewear device 305 with a frame 310 configured to hold a left display device 315(A) and a right display device 315(B) in front of a user's eyes. Display devices 315(A) and 315(B) may act together or independently to present an image or series of images to a user. While augmented reality system 300 includes two displays, embodiments of this disclosure may be implemented in augmented reality systems with a single NED or more than two NEDs.

In some embodiments, the augmented reality system 300 may include one or more sensors, such as a sensor 320 located on the frame 310. The sensor 320 may generate measurement signals in response to motion of the augmented reality system 300 and may be located on substantially any portion of the frame 310. The sensor 320 may represent one or more of a variety of different sensing mechanisms, such as a position sensor, an inertial measurement unit (IMU), a depth camera assembly, a structured light emitter and/or detector, or any combination thereof. In some embodiments, the augmented reality system 300 may or may not include the sensor 320 or may include more than one sensor. In embodiments in which the sensor 320 includes an IMU, the IMU may generate calibration data based on measurement signals from the sensor 320. Examples of the sensor 320 may include, without limitation, accelerometers, gyroscopes, magnetometers, other suitable types of sensors that detect motion, sensors used for error correction of the IMU, or some combination thereof.

In some examples, the augmented reality system 300 may also include a microphone array with a plurality of acoustic transducers 325(A)-325(J), referred to collectively as acoustic transducers 325. The acoustic transducers 325 may represent transducers that detect air pressure variations induced by sound waves. Each of the acoustic transducers 325 may be configured to detect sound and convert the detected sound into an electronic format (e.g., an analog or digital format). The microphone array in FIG. 3A may include, for example, ten acoustic transducers: acoustic transducers 325(A) and 325(B), which may be designed to be placed inside a corresponding ear of the user, acoustic transducers 325(C), 325(D), 325(E), 325(F), 325(G), and 325(H), which may be positioned at various locations on the frame 310, and/or acoustic transducers 325(I) and 325(J), which may be positioned on a corresponding neckband 330.

In some embodiments, one or more of the acoustic transducers 325 may be used as output transducers (e.g., speakers). For example, the acoustic transducers 325(A) and/or 325(B) may be earbuds or any other suitable type of headphone or speaker. The configuration of the acoustic transducers 325 of the microphone array may vary. While the augmented reality system 300 is shown in FIG. 3 as having ten acoustic transducers 325, the number of acoustic transducers 325 may be greater or less than ten. In some embodiments, using a greater number of acoustic transducers 325 may increase the amount of audio information collected and/or the sensitivity and accuracy of the audio information. In contrast, using a lesser number of acoustic transducers 325 may decrease the computing power required by an associated controller 335 to process the collected audio information. In addition, the position of each of the acoustic transducers 325 of the microphone array may vary. For example, the position of a given one of the acoustic transducers 325 may include a defined position on the user, a defined coordinate on frame 310, a particular orientation, or some combination thereof.

The acoustic transducers 325(A) and 325(B) may be positioned on different parts of the user's ear, such as behind the pinna, behind the tragus, and/or within the auricle or fossa. Or there may be additional acoustic transducers 325 on or surrounding the ear in addition to acoustic transducers 325 inside the ear canal. Having one or more of the acoustic transducers 325 positioned next to an ear canal of a user may enable the microphone array to collect information on how sounds arrive at the ear canal. For example, by positioning at least two of acoustic transducers 325 on either side of a user's head (e.g., as binaural microphones), the augmented reality system 300 may simulate binaural hearing and capture a 3D stereo sound field around about a user's head. In some embodiments, the acoustic transducers 325(A) and 325(B) may be connected to the augmented reality system 300 via a wired connection 340, and in other embodiments the acoustic transducers 325(A) and 325(B) may be connected to the augmented reality system 300 via a wireless connection (e.g., a Bluetooth connection). In still other embodiments, the acoustic transducers 325(A) and 325(B) may not be used at all in conjunction with the augmented reality system 300.

The acoustic transducers 325 on the frame 310 may be positioned in a variety of different ways, including along the length of the temples, across the bridge, above or below the display devices 315(A) and 315(B), or some combination thereof. The acoustic transducers 325 may also be oriented such that the microphone array is able to detect sounds in a wide range of directions surrounding the user wearing the augmented reality system 300. In some embodiments, an optimization process may be performed during manufacturing of the augmented reality system 300 to determine relative positioning of each of the acoustic transducers 325 in the microphone array.

In some examples, the augmented reality system 300 may include or be connected to an external device (e.g., a paired device), such as the neckband 330. The neckband 330 generally represents any type or form of paired device. Thus, the following discussion of the neckband 330 may also apply to various other paired devices, such as charging cases, smart watches, smart phones, wrist bands, other wearable devices, hand-held controllers, tablet computers, laptop computers, other external computer devices, etc.

As shown, the neckband 330 may be coupled to the eyewear device 305 via one or more connectors. The connectors may be wired or wireless and may include electrical and/or non-electrical (e.g., structural) components. In some cases, the eyewear device 305 and the neckband 330 may operate independently without any wired or wireless connection between them. While FIG. 3A illustrates the components of the eyewear device 305 and the neckband 330 in example locations on the eyewear device 305 and the neckband 330, the components may be located elsewhere and/or distributed differently on the eyewear device 305 and/or the neckband 330. In some embodiments, the components of the eyewear device 305 and the neckband 330 may be located on one or more additional peripheral devices paired with the eyewear device 305, the neckband 330, or some combination thereof.

Pairing external devices, such as the neckband 330, with augmented reality eyewear devices may enable the eyewear devices to achieve the form factor of a pair of glasses while still providing sufficient battery and computation power for expanded capabilities. Some or all of the battery power, computational resources, and/or additional features of the augmented reality system 300 may be provided by a paired device or shared between a paired device and an eyewear device, thus reducing the overall weight, heat profile, and form factor of the eyewear device while still retaining desired functionality. For example, the neckband 330 may allow components that would otherwise be included on an eyewear device to be included in the neckband 330 since users may better tolerate a heavier weight load on their shoulders than on their heads. The neckband 330 may also have a larger surface area over which to diffuse and disperse heat to the ambient environment. Thus, the neckband 330 may allow for greater battery and computation capacity than might otherwise have been possible on a stand-alone eyewear device. Since weight carried in the neckband 330 may be less invasive to a user than weight carried in the eyewear device 305, a user may tolerate wearing a lighter eyewear device and carrying or wearing the paired device for greater lengths of time than a user would tolerate wearing a heavy standalone eyewear device, thereby enabling users to more fully incorporate extended reality environments into their day-to-day activities.

The neckband 330 may be communicatively coupled with the eyewear device 305 and/or to other devices. These other devices may provide certain functions (e.g., tracking, localizing, depth mapping, processing, storage, etc.) to the augmented reality system 300. In the embodiment of FIG. 3A, for example, the neckband 330 may include two acoustic transducers (e.g., 325(I) and 325(J)) that are part of the microphone array (or potentially form their own microphone subarray). The neckband 330 may also include a controller 342 and a power source 345.

The acoustic transducers 325(I) and 325(J) of the neckband 330 may be configured to detect sound and convert the detected sound into an electronic format (analog or digital). In the embodiment of FIG. 3A, the acoustic transducers 325(I) and 325(J) may be positioned on the neckband 330, thereby increasing the distance between the neckband acoustic transducers 325(I) and 325(J) and other ones of the acoustic transducers 325 positioned on the eyewear device 305. In some cases, increasing the distance between the acoustic transducers 325 of the microphone array may improve the accuracy of beamforming performed via the microphone array. For example, if a sound is detected by the acoustic transducers 325(C) and 325(D) and the distance between acoustic transducers 325(C) and 325(D) is greater than, e.g., the distance between acoustic transducers 325(D) and 325(E), the determined source location of the detected sound may be more accurate than if the sound had been detected by the acoustic transducers 325(D) and 325(E).

The controller 342 of the neckband 330 may process information generated by the sensors on the neckband 330 and/or the augmented reality system 300. For example, the controller 342 may process information from the microphone array that describes sounds detected by the microphone array. For each detected sound, the controller 342 may perform a direction-of-arrival (DOA) estimation to estimate a direction from which the detected sound arrived at the microphone array. As the microphone array detects sounds, the controller 342 may populate an audio data set with the information. In embodiments in which the augmented reality system 300 includes an inertial measurement unit (IMU) located on the eyewear device 305, the controller 342 may compute all inertial and spatial calculations from the IMU. A connector may convey information between the augmented reality system 300 and the neckband 330 and between the augmented reality system 300 and the controller 342. The information may be in the form of optical data, electrical data, wireless data, or any other transmittable data form. Moving the processing of information generated by the augmented reality system 300 to the neckband 330 may reduce weight and heat in the eyewear device 305, making it more comfortable to the user.

The power source 345 in the neckband 330 may provide power to the eyewear device 305 and/or to the neckband 330. The power source 345 may include, without limitation, lithium-ion batteries, lithium-polymer batteries, primary lithium batteries, alkaline batteries, or any other form of power storage. In some cases, the power source 345 may be a wired power source. Locating the power source 345 on the neckband 330 instead of on the eyewear device 305 may help to better distribute the weight and heat generated by power source 345.

As noted, some extended reality systems may, instead of blending an extended reality with actual reality, substantially replace one or more of a user's sensory perceptions of the real world with a virtual experience. One example of this type of system is a head-worn display system, such as the virtual reality system 350 depicted in FIG. 3B, which mostly or completely covers a user's field of view. The virtual reality system 350 may include a front rigid body 355 and a band 360 shaped to fit around a user's head. The virtual reality system 900350 may also include output audio transducers 365(A) and 365(B). Furthermore, while not shown in FIG. 3B, the front rigid body 355 may include one or more electronic elements, including one or more electronic displays, one or more inertial measurement units (IMUs), one or more tracking emitters or detectors, and/or any other suitable device or system for creating an extended reality experience.

Extended reality systems may include various types of visual feedback mechanisms. For example, display devices in the augmented reality system 300 and/or the virtual reality system 350 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These extended reality systems may include a single display screen for both eyes or may provide a display screen for each eye, which may allow for additional flexibility for varifocal adjustments or for correcting a user's refractive error. Some of these extended reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the extended reality systems described herein may include one or more projection systems. For example, display devices in the augmented reality system 300 and/or the virtual reality system 350 may include micro-LED projectors that project light (using, e.g., a waveguide) into display devices, such as clear combiner lenses that allow ambient light to pass through. The display devices may refract the projected light toward a user's pupil and may enable a user to simultaneously view both extended reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Extended reality systems may also be configured with any other suitable type or form of image projection system, such as retinal projectors used in virtual retina displays.

The extended reality systems described herein may also include various types of computer vision components and subsystems. For example, the augmented reality system 300 and/or the virtual reality system 350 may include one or more optical sensors, such as two-dimensional (2D) or three-dimensional (3D) cameras, structured light transmitters and detectors, time-of-flight depth sensors, single-beam or sweeping laser rangefinders, 3D LiDAR sensors, and/or any other suitable type or form of optical sensor. An extended reality system may process data from one or more of these sensors to identify a location of a user, to map the real world, to provide a user with context about real-world surroundings, and/or to perform a variety of other functions.

The extended reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the extended reality systems described herein may also include tactile (e.g., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independently of other extended reality devices, within other extended reality devices, and/or in conjunction with other extended reality devices.

By providing haptic sensations, audible content, and/or visual content, extended reality systems may create an entire virtual experience or enhance a user's real-world experience in a variety of contexts and environments. For instance, extended reality systems may assist or extend a user's perception, memory, or cognition within a particular environment. Some systems may enhance a user's interactions with other people in the real world or may enable more immersive interactions with other people in a virtual world. Extended reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's extended reality experience in one or more of these contexts and environments and/or in other contexts and environments.

As noted, the extended reality systems 300 and 350 may be used with a variety of other types of devices to provide a more compelling extended reality experience. These devices may be haptic interfaces with transducers that provide haptic feedback and/or that collect haptic information about a user's interaction with an environment. The extended reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 4A:
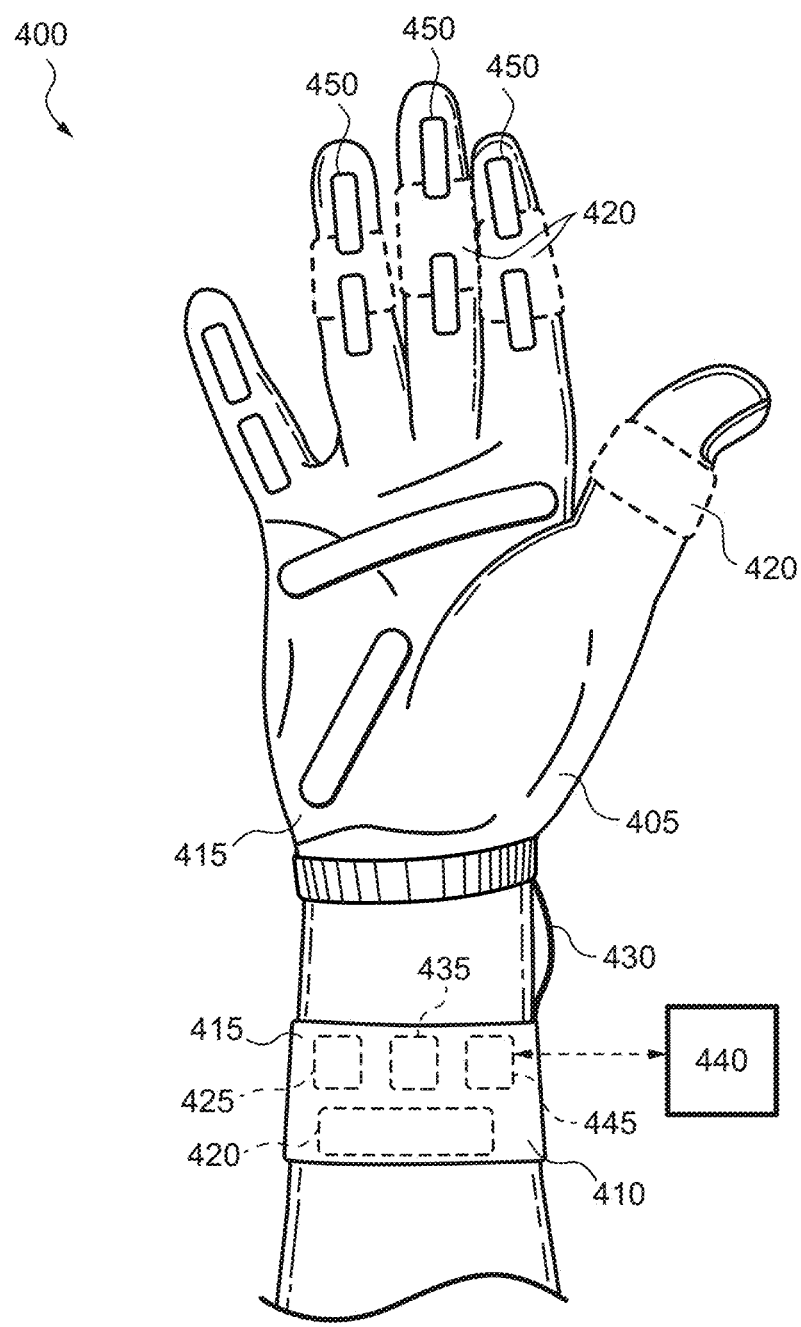
FIG. 4A is an illustration of haptic devices in accordance with various embodiments.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 4A illustrates a vibrotactile system 400 in the form of a wearable glove (haptic device 405) and wristband (haptic device 410). The haptic device 405 and the haptic device 410 are shown as examples of wearable devices that include a flexible, wearable textile material 415 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 420 may be positioned at least partially within one or more corresponding pockets formed in textile material 415 of vibrotactile system 400. The vibrotactile devices 420 may be positioned in locations to provide a vibrating sensation (e.g., haptic feedback) to a user of the vibrotactile system 400. For example, the vibrotactile devices 420 may be positioned against the user's finger(s), thumb, and/or wrist, as shown in FIG. 4A. The vibrotactile devices 420 may, in some examples, be sufficiently flexible to conform to or bend with the user's corresponding body part(s).

A power source 425 (e.g., a battery) for applying a voltage to the vibrotactile devices 420 for activation thereof may be electrically coupled to the vibrotactile devices 420, such as via conductive wiring 430. In some examples, each of the vibrotactile devices 420 may be independently electrically coupled to the power source 425 for individual activation. In some embodiments, a processor 435 may be operatively coupled to the power source 425 and configured (e.g., programmed) to control activation of the vibrotactile devices 420.

The vibrotactile system 400 may be implemented in a variety of ways. In some examples, the vibrotactile system 400 may be a standalone system with integral subsystems and components for operation independent of other devices and systems. As another example, the vibrotactile system 400 may be configured for interaction with another device or system 440. For example, the vibrotactile system 400 may, in some examples, include a communications interface 445 for receiving and/or sending signals to the other device or system 440. The other device or system 440 may be a mobile device, a gaming console, an extended reality (e.g., virtual reality, augmented reality, mixed-reality) device, a personal computer, a tablet computer, a network device (e.g., a modem, a router, etc.), a handheld controller, etc. The communications interface 445 may enable communications between the vibrotactile system 400 and the other device or system 440 via a wireless (e.g., Wi-Fi, Bluetooth, cellular, radio, etc.) link or a wired link. If present, the communications interface 445 may be in communication with the processor 435, such as to provide a signal to the processor 435 to activate or deactivate one or more of the vibrotactile devices 420.

The vibrotactile system 400 may optionally include other subsystems and components, such as touch-sensitive pads 450, pressure sensors, motion sensors, position sensors, lighting elements, and/or user interface elements (e.g., an on/off button, a vibration control element, etc.). During use, the vibrotactile devices 420 may be configured to be activated for a variety of different reasons, such as in response to the user's interaction with user interface elements, a signal from the motion or position sensors, a signal from the touch-sensitive pads 450, a signal from the pressure sensors, a signal from the other device or system 440, etc.

Although the power source 425, the processor 435, and the communications interface 445 are illustrated in FIG. 4A as being positioned in the haptic device 410, the present disclosure is not so limited. For example, one or more of the power source 425, the processor 435, or the communications interface 445 may be positioned within the haptic device 405 or within another wearable textile.

Figure 4B:
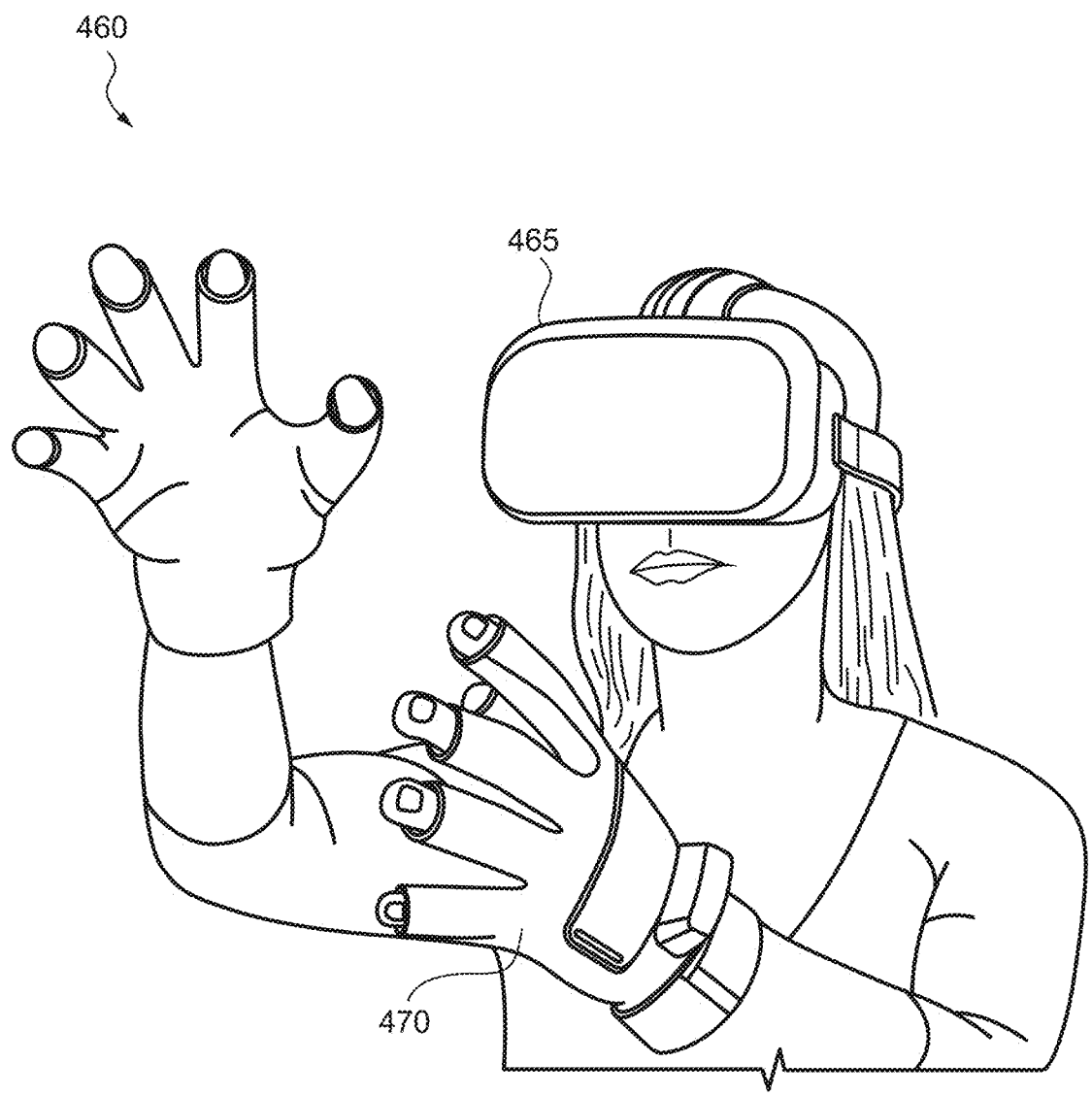
FIG. 4B is an illustration of an exemplary virtual reality environment in accordance with various embodiments.

Haptic wearables, such as those shown in and described in connection with FIG. 4A, may be implemented in a variety of types of extended reality systems and environments. An example of one such extended reality environment 460 is shown in FIG. 4B and includes one head-mounted virtual reality display and two haptic devices (e.g., gloves). Any number and/or combination of these components and other components may be included in other embodiments of an extended reality system. For example, in some embodiments there may be multiple head-mounted displays each having an associated haptic device, with each head-mounted display and each haptic device communicating with the same console, portable computing device, or other computing system.

Figure 3B:
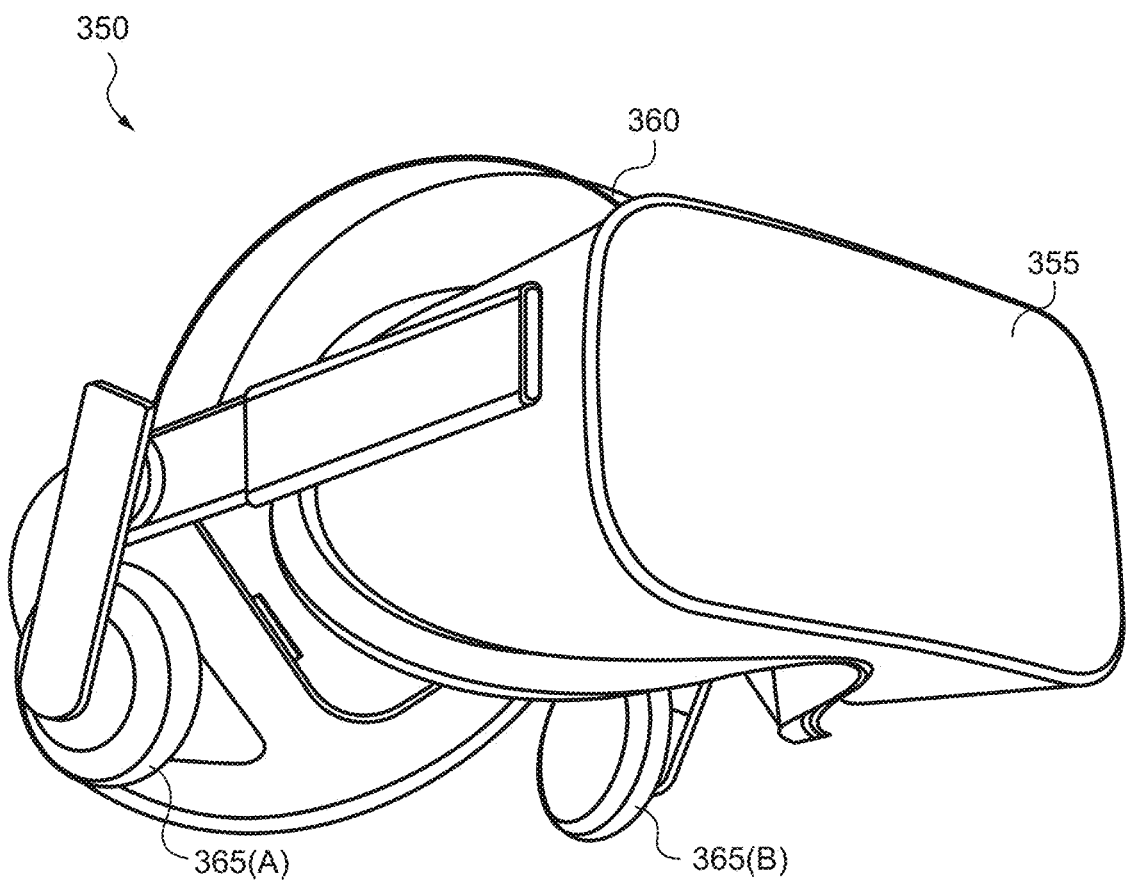
FIG. 3B is an illustration of a virtual reality system in accordance with various embodiments.

In FIG. 4B, the head-mounted-display (HMD) 465 of the extended reality environment 460 generally represents any type or form of virtual reality system, such as the virtual reality system 350 in FIG. 3B. Likewise, the haptic device 470 generally represents any type or form of wearable device, worn by a user of an extended reality system, that provides haptic feedback to the user to give the user the perception that he or she is physically engaging with a virtual object. In some embodiments, the haptic device 470 may provide haptic feedback by applying vibration, motion, and/or force to the user. For example, the haptic device 470 may limit or augment a user's movement. To give a specific example, the haptic device 470 may limit a user's hand from moving forward so that the user has the perception that his or her hand has come into physical contact with a virtual wall. In this specific example, one or more actuators within the haptic device may achieve the physical-movement restriction by pumping fluid into an inflatable bladder of the haptic device. In some examples, a user may also use haptic device 470 to send action requests to a console. Examples of action requests include, without limitation, requests to start an application and/or end the application and/or requests to perform a particular action within the application.

Figure 4C:
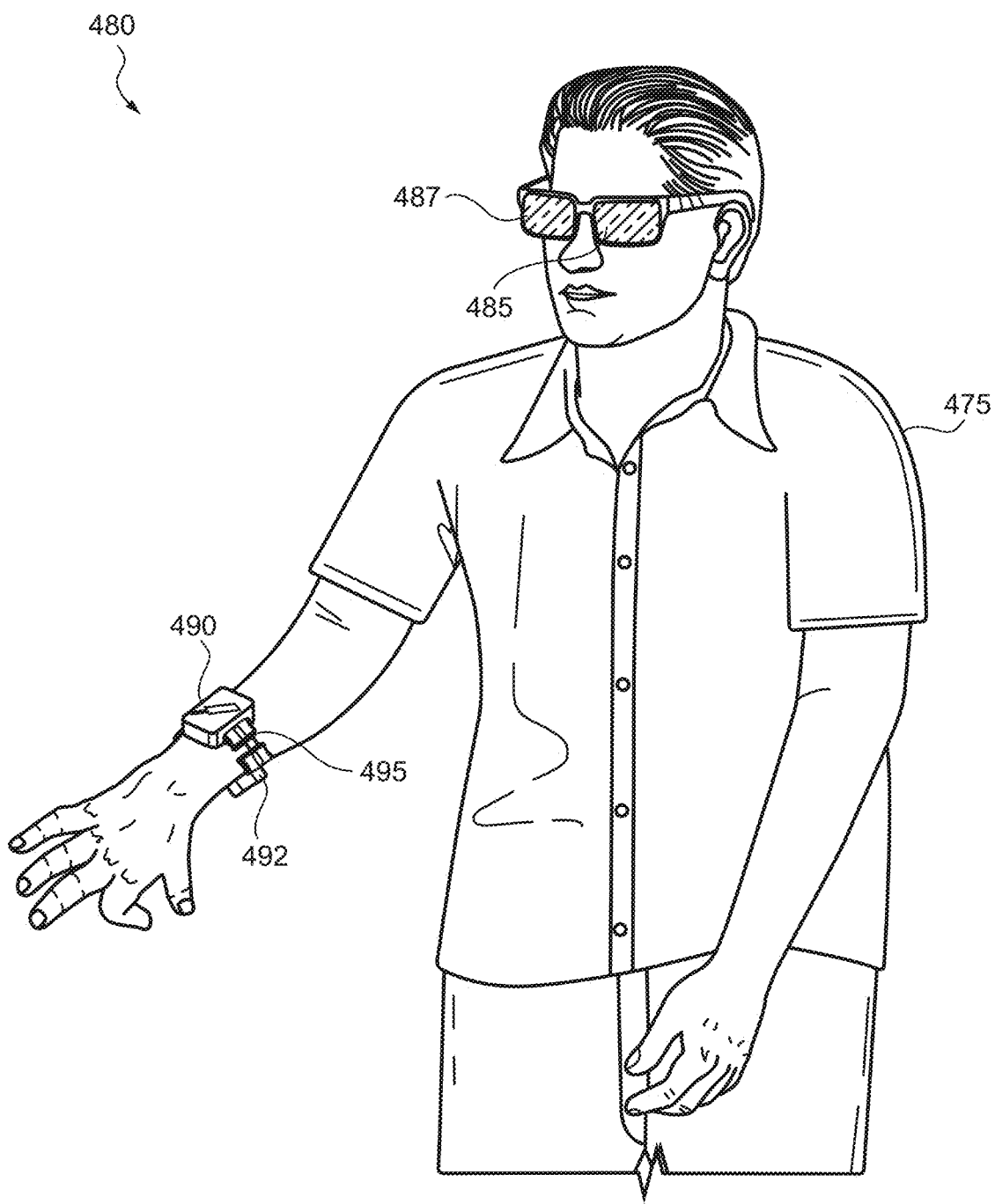
FIG. 4C is an illustration of an exemplary augmented reality environment in accordance with various embodiments.

While haptic interfaces may be used with virtual reality systems, as shown in FIG. 4B, haptic interfaces may also be used with augmented reality systems, as shown in FIG. 4C, where a user 475 is interacting with an augmented reality system 480. In this example, the user 475 may wear a pair of augmented reality glasses 485 that may have one or more displays 487 and that are paired with a haptic device 490. In this example, the haptic device 490 may be a wristband that includes a plurality of band elements 492 and a tensioning mechanism 495 that connects the band elements 492 to one another.

One or more of the band elements 492 may include any type or form of actuator suitable for providing haptic feedback. For example, one or more of the band elements 492 may be configured to provide one or more of various types of cutaneous feedback, including vibration, force, traction, texture, and/or temperature. To provide such feedback, the band elements 492 may include one or more of various types of actuators. In one example, each of the band elements 492 may include a vibrotactor (e.g., a vibrotactile actuator), which can be configured to vibrate in unison or independently to provide one or more of various types of haptic sensations to a user. Alternatively, only a single band element or a subset of band elements may include vibrotactors.

The haptic devices 405, 410, 470, and 490 of FIGS. 4A-4C may include any suitable number and/or type of haptic transducer, sensor, and/or feedback mechanism. For example, the haptic devices 405, 410, 470, and 490 may include one or more mechanical transducers, piezoelectric transducers, and/or fluidic transducers. The haptic devices 405, 410, 470, and 490 may also include various combinations of different types and forms of transducers that work together or independently to enhance a user's extended reality experience. In one example, each of the band elements 492 of the haptic device 490 may include a vibrotactor (e.g., a vibrotactile actuator) configured to vibrate in unison or independently to provide one or more of various types of haptic sensations to a user.

2. Shortcuts in Extended Reality Systems

A. Shortcut Design

Researchers have studied and developed various shortcuts based on device capabilities and input needs. Shortcuts such as hotkeys and static toolbars were popular from the early days of personal computers. Keyboard-based hotkeys (e.g., Ctrl-C, Ctrl-V) have been widely adopted, system and application-wise, and dedicated physical shortcut keys also exist. Various shortcut designs in 2D GUIs have also been explored for devices such as personal computers, however, there has been a lack of research and design associated with shortcuts for use in extended reality systems and environments. And to the extent research has been performed relative to extended reality shortcut interaction techniques and input methods, very little work has been done to determine how shortcuts can reduce interaction friction in a setting such as everyday AR. The techniques disclosed herein are directed to a design space to support extended reality shortcut design and assignment so as to provide an efficient and improved immersive extended reality experience.

B. Types of Shortcuts

Extended reality shortcut design embodiments may be inspired by popular shortcuts in devices such as personal computers (PCs) and smart phones. Different types of extended reality shortcuts are possible and described herein, as are various implications of contextualized Artificial Intelligence (AI) assistance in interaction paradigms with advanced context-sensing capabilities like every-day AR.

i. Virtual Buttons

Figure 5A:
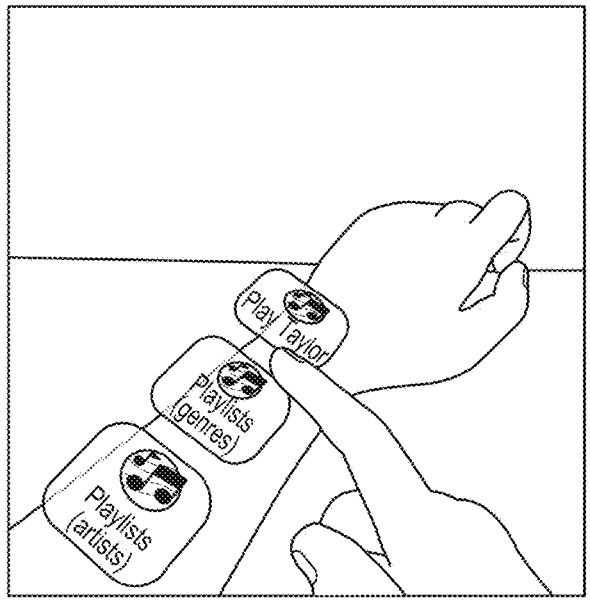
FIGS. 5A-5D illustrate several types of shortcuts that may be created and used in an extended reality system in accordance with various embodiments.

Hotkeys are perhaps the most established example of shortcuts for the PC, involving for example, a single key press or a sequence of key presses. Hotkeys are typically associated with physical controllers such as keyboards, meaning that hotkey buttons and corresponding labels are normally limited to their original physical form. In contrast, shortcut designs for extended reality can easily overcome these limitations through the use of virtual buttons. It has been discovered that it is possible to avoid sequences of key presses, which usually have higher learning curves, by using virtual buttons that can each initiate multiple functions with a single press. Since an extended reality shortcut is not constrained to a fixed number of buttons on a physical input device, virtual buttons can be anchored to convenient positions, such as on the user's body or elsewhere in the user's environment. In one such example, virtual controls for a media player could be anchored to a coffee table in a living room where a given user is typically located when interacting with the media player. In another example, which is represented in FIG. 5A, virtual buttons may be anchored to the arm of a user, thereby removing or reducing location constraints associated with use of the virtual buttons. It is also possible to create and use virtual buttons in cooperation with physical hotkeys, thereby allowing users to benefit from the advantages of each approach.

ii. Gestures/Hand Poses

Figure 5B:

Gestures are another type of shortcut that may encountered when using devices containing touchscreens or touchpads. Gestures associated with touchscreens or touchpads, such as those commonly found on/in tablets and laptops, tend to be limited to 2D gestures because of sensing limitations. In contrast, shortcut interaction paradigms in extended reality can leverage 3D tracking of controllers or hand-input recognition to allow for more possibilities. Hand-tracking is becoming more popular in the extended reality environment, and some gesture or hand pose shortcuts are already available in extended reality systems and devices, such as the Oculus Quest 2 SDK (see FIG. 7B). In some embodiments according to the present disclosure, a user can personalize which gesture shortcut triggers a given command. One example of using a selected hand gesture to cause a media player to load a next song is illustrated in FIG. 5B.

iii. Marking Menu

Figure 5C:
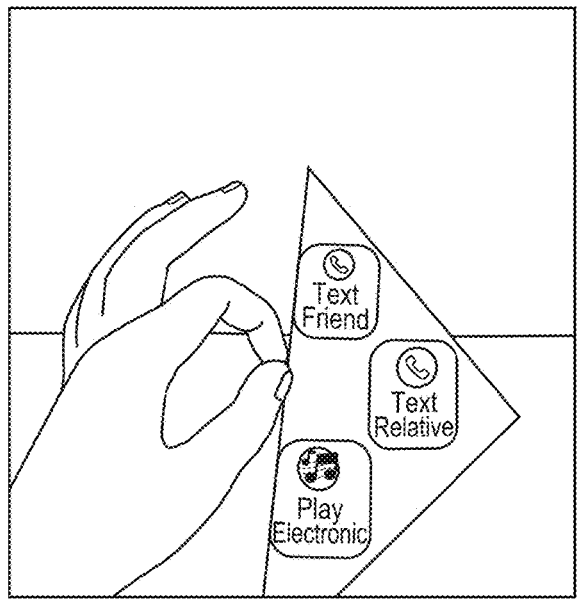

Marking menus are another popular type of shortcut type in existing 2D GUIs. Generally speaking, marking menus are pop up GUI palettes where a user can save frequently used commands for quick retrieval and use. Virtual 3D extended reality shortcuts generally based on 2D marking menus are also possible. As illustrated in FIG. 5C, one example of a virtual marking menu can be caused to pop up in an extended reality environment when a user pinches together the thumb and index finger of their hand. In some embodiments, the virtual marking menu interface may be designed to avoid hand occlusion by incorporating a half-circle or triangular-shaped menu, as shown. Operating such a virtual marking menu in an extended reality environment through the use of hand gestures (hand input) reduces the interaction friction associated with a typical 2D GUI marking menu input device, such as a pen or a mouse.

iv. Smart Button

Figure 5D:
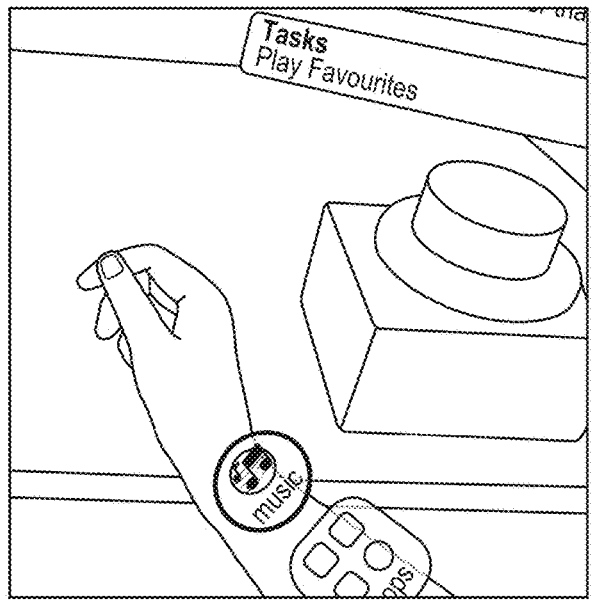

A hotkey or other type of hard button input typically executes fixed functionality depending on the state of the associated system. It is realized, however, that it may be desirable to create smart virtual buttons whose functionality can change depending on user intent. To this end, another extended reality shortcut embodiment can comprise an intelligent and dynamic virtual button (smart button), whereby sensing functionality in the extended reality environment can be used to predict user intent based on context or otherwise and quickly update the function of the smart button to match. The use of dynamic and predictive smart buttons can facilitate improved content interaction while reducing user interaction time, especially but not only in the case of frequently performed tasks. As a smart button may be a type of virtual button when used in an extended reality setting, a smart button can be anchored to a user or to an object in the user's environment. One example of a smart button anchored to a user's arm is illustrated in FIG. 5D.

v. User-Defined Automations

Shortcuts designed for use in extended reality systems can be customized according to user preferences in a similar manner to the way that modern smartphones allow users to personalize sequences of actions that are triggered based on specific conditions. In the case of extended reality systems, however, context sensing by extended reality devices may offer more robust customization possibilities by allowing users to customize what context within the extended reality environment will trigger a given policy or shortcut. In this regard, an automation defined by a user can act as a shortcut for one or multiple actions. For example, a user can create a shortcut in the form of a custom rule whereby background noise is automatically muted and notifications are automatically turned off when the system detects that the user is reading a book.

C. User Interaction Modeling

It is known that interaction modeling can be utilized to help understand and simulate how users might interact with UIs. For example, a keystroke-level model may be implemented to predict the time a user takes to perform a given task in a system and Goals, Operators, Methods, and Selection (GOMS) models may be implemented to identify and eliminate unnecessary user actions. Other analyses and shortcut strategies for minimizing user interaction time with UIs and GUIs have also been conducted and studied. However, none of the past studies have considered extended reality-specific issues such as, for example, cognitive and motor costs relative to user interactions in an extended reality system. Rather, past analyses and studies have been limited to specific non-extended reality applications and, therefore, do not provide any insight into extended reality system application. Consequently, the methods, systems, and modeling and other techniques disclosed herein employ an optimization approach that is entirely different from the approaches of known techniques for creating and assigning real-world 2D UIs. For example, the optimization approach described herein is directed to the use of a predictive model to optimize cognitive and motor costs generated in user-system interactions. In some embodiments, genetic algorithms may be used by the predictive model.

D. UI Optimization for Extended Reality

Optimization-based approaches to human-computer interaction (HCI) can be advantageous due to their ability to adapt an interface based on user context and to improve usability. To that end, the techniques disclosed herein employ a predictive model to determine shortcut assignment combinatorial optimization and to further configure optimal shortcut assignments to graphic user interfaces. The disclosed techniques improve the time efficiency and cost associated with shortcut assignment combinatorial optimization, and provide an immersive experience to users of the associated extended reality system without unnecessary disruption. In some embodiments, shortcut optimization can run ad-hoc (e.g., at the end of an interaction session), and there are no real-time requirements typical in extended reality adaptive interfaces.

3. Shortcut Assignment Optimization Overview

Figure 6:
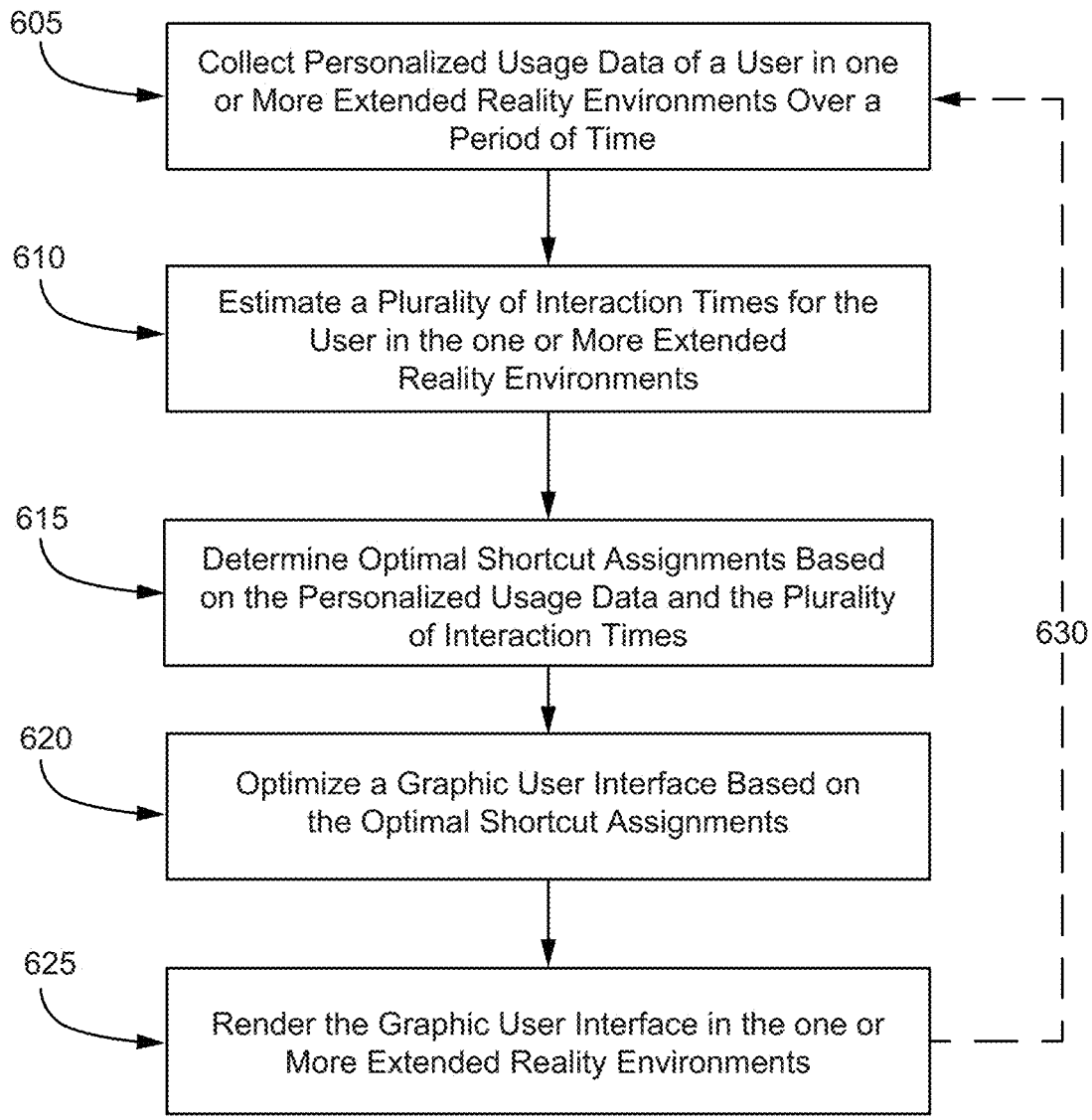
FIG. 6 is a flow diagram representing a process for optimizing and assigning shortcuts in an extended reality system using a predictive model in accordance with various embodiments.
Figure 8:
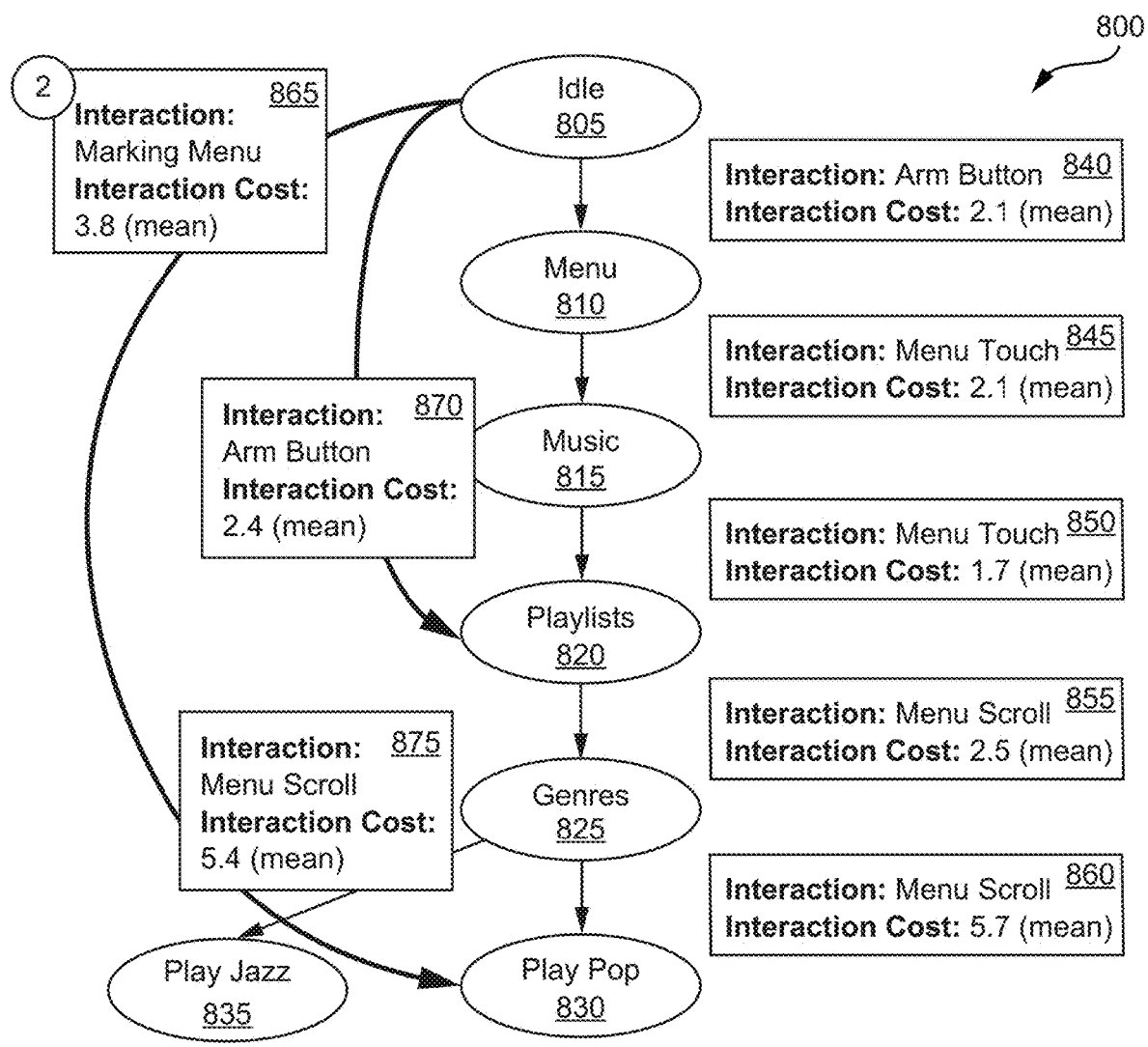
FIG. 8 is a directed acyclic graph with nodes and edges that can be used in a predictive model in accordance with various embodiments.

FIG. 6 is a flow diagram 600 representing a process for dynamically optimizing and assigning shortcuts in an extended reality system using a predictive model in accordance with various embodiments. As represented in block 605 of the diagram 600, personalized usage data associated with a user in one or more extended reality environments over a period of time is collected. The personalized usage data may comprise a set of functionalities that have been used by the user, a type of each functionality, a usage rate of each functionality, a usage time of each functionality, an environment associated with each functionality, and/or a time to complete a task associated with one or more functionalities in the set of functionalities. In some embodiments, a functionality may be a shortcut to equivalently execute functions of a subset of functionalities to complete a task. For example, as shown in FIG. 8, a user can start from an idle state and may use a virtual arm button to open a menu in one environment. The user interaction with the virtual arm button may be recorded and collected by the system as a functionality, and the type of the functionality (e.g., interaction using an arm button) and the usage time of the functionality may also be collected. In some embodiments, the usage time of the functionality is the computing time required by the extended reality system to execute the functionality. In some embodiments, the usage time of the functionality is an average interaction cost over the period of interaction time. In some embodiments, the interaction cost comprises both a computing cost to execute the functionality and a learning cost for the user to perform the interaction to trigger the functionality. A functionality may be a shortcut (as shown in FIG. 8 by the curved lines) that is functionally equivalent to a set of functionalities and completes a task (e.g., go to "playlists" or "play pop").

In some embodiments, a set of shortcuts may be pre-assigned to the user before, after, or simultaneously with the collection of personalized usage data. The shortcuts may comprise, for example, (i) arm button shortcuts; (ii) gesture shortcuts; (iii) marking menu shortcuts; (iv) smart button shortcuts; (v) user-defined automation shortcuts; or (vi) any combination thereof. Each shortcut may be assigned to execute a set of functionalities using a predetermined rule. For example, an arm button shortcut may be assigned to open a main menu for the user in one environment. In some embodiments, the user has an option to accept or refuse an assignment of one or more shortcuts.

After providing the collected personalized usage data to a predictive model, a plurality of interaction times for the user in the one or more extended reality environments can be estimated by the predictive model, as indicated in block 610. Each interaction time in the plurality of interaction times is associated with a functionality in the set of functionalities that have been used by the user over the period of time. In some embodiments, an estimated interaction time is the actual computing time required by the extended reality system to execute the associated functionality. In some embodiments, an estimated interaction time comprises a computing time to execute the functionality and a learning cost (or interaction time) for the user to perform the interaction to trigger the functionality. In some embodiments, an estimated interaction time is an average interaction time over the period of time. In some embodiments, an estimated interaction time is a mean interaction time over the period of time. It should be understood that different statistical methods or indexes (e.g., weighted mean, maximum value, minimum value, and the like) may be used to estimate the interaction time.

At block 615, optimal shortcut assignments can be determined by the predictive model based on the personalized usage data and the plurality of interaction times. The optimal shortcut assignments assign a set of shortcuts to execute functionalities in the one or more extended reality environments. The set of shortcuts may be assigned to execute functionalities in different environments. For example, a first shortcut may be generated as an arm button shortcut, and the arm button shortcut may be generated in a physical environment. A second shortcut may also be generated as a hand pose button, and the hand pose button may be generated in a virtual environment.

At block 620, an optimized graphic user interface in the one or more extended reality environments can be generated by the predictive model based on the optimal shortcut assignments. In some embodiments, the graphic user interface is generated based on the optimal shortcut assignments that are provided to the user using the graphic user interface. In some embodiments, the graphic user interface is predetermined based on a set of predetermined shortcuts, and the optimal shortcut assignments are used to update the graphic user interface and its associated shortcuts.

At block 625, the optimized graphic user interface can be rendered to the user in the one or more extended reality environments. The rendering may be based on available technologies. The rendered graphic user interface enables the user to use the extended reality system in a manner that reduces overall interaction time, improves the user experience, and improves performance of the extended reality system.

As is also represented in FIG. 6, in some embodiments, an extended reality system may execute a feedback loop 630 that restarts the process of collecting personalized usage data of the user after rendering an initial optimized graphic user interface. New personalized usage data may then be collected over some predetermined time period relative to the previously generated shortcut assignments and used by the predictive model in conjunction with newly estimated interaction times to determine if the shortcuts, shortcut assignments, or graphic user interface should be revised. For example, after the graphic user interface is rendered to the user, the user may use or may not use the shortcuts provided in the graphic user interface. In some embodiments, the user has an option to accept or reject a shortcut assignment and may manually choose a shortcut associated with a functionality. In some embodiments, the graphic user interface suggests one or more of the shortcuts in the optimal shortcut assignments to the user in the one or more extended reality environments. A user action may be triggered by the suggesting of the one or more shortcuts, and the graphical user interface may be updated in the one or more extended reality environments based on the user action triggered by the suggesting of the one or more shortcuts. For example, if the user rejects an assigned shortcut, the extended reality system can automatically execute the feedback loop 630 and return to the beginning of the process in order to determine updated shortcut assignments.

Figure 7A:
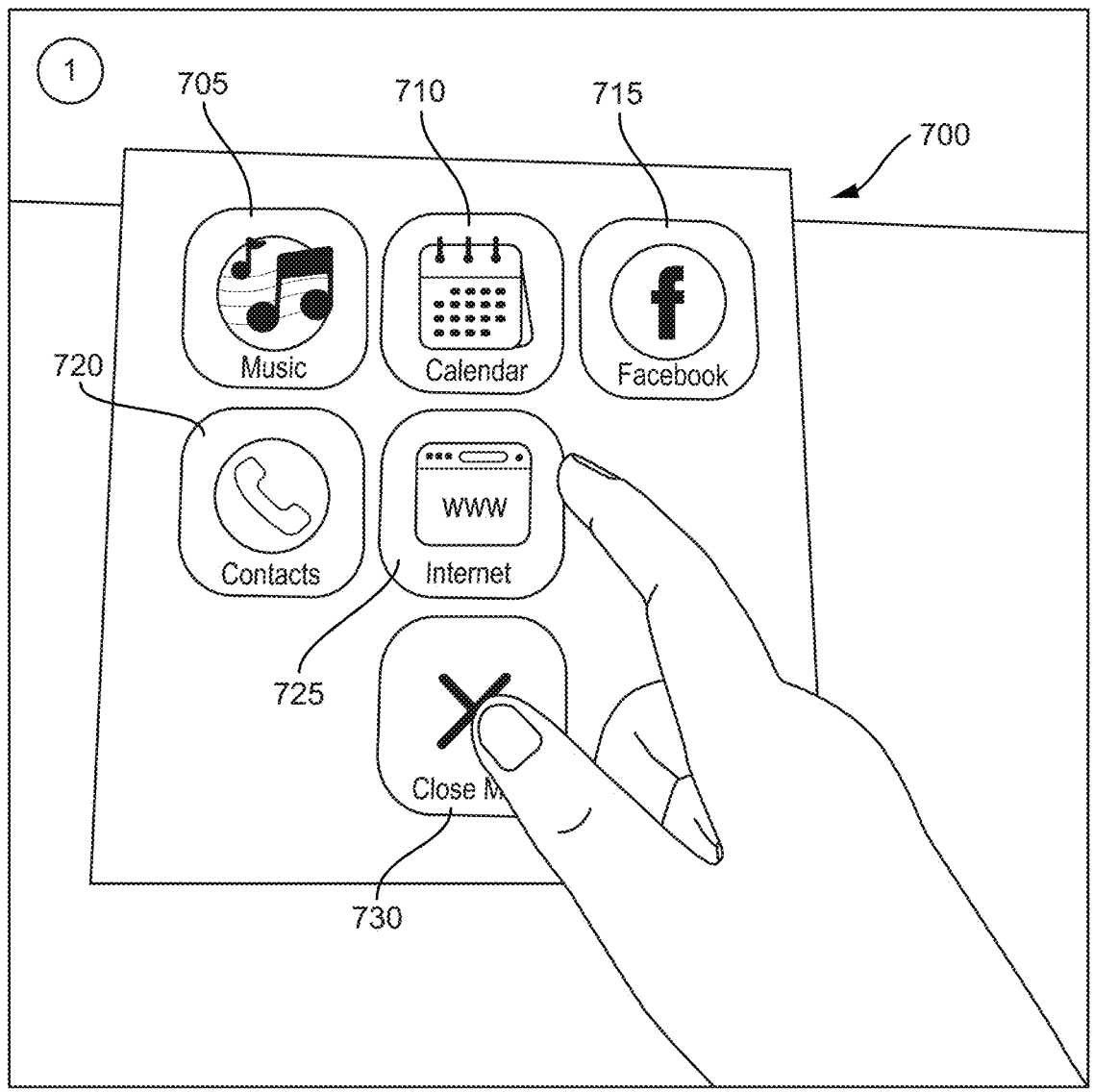
FIG. 7A illustrates an interaction user interface in accordance with various embodiments.

FIG. 7A illustrates an interaction user interface 700 with six shortcuts 705-730 represented as buttons. Each of the shortcuts 705-730 can include one or more optimized functionalities that cause particular actions to occur upon shortcut selection. For example, selection of the shortcut 720 opens a list of user contacts.

Figure 7B:
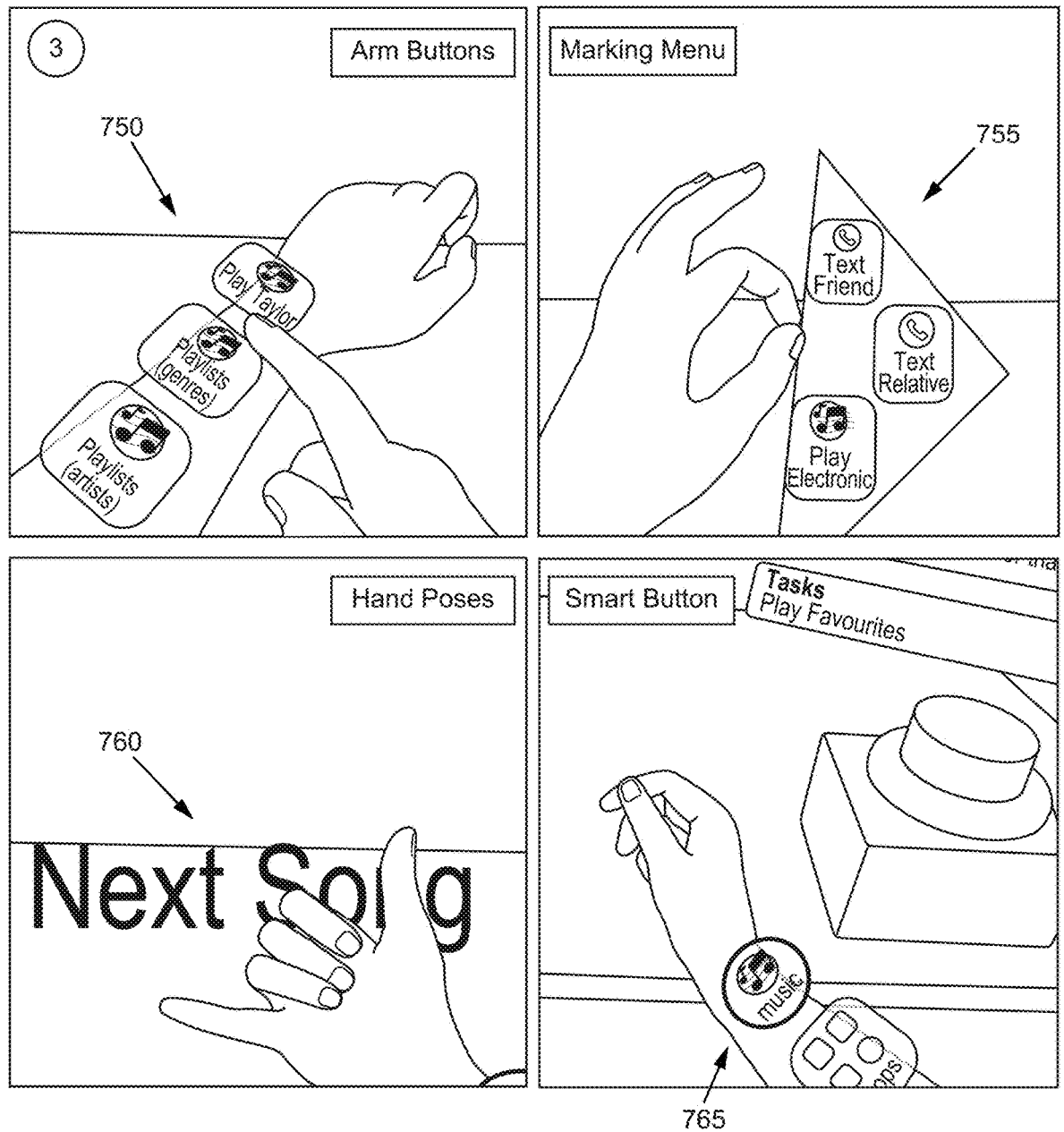
FIG. 7B is an illustration of four types of shortcuts: arm button shortcuts, marking menu shortcuts, hand pose shortcuts, and smart button shortcuts, in accordance with various embodiments.

FIG. 7B illustrates four other types of shortcuts: arm button shortcuts 750, marking menu shortcuts 755, hand pose (gesture) shortcuts 760, and a smart button shortcut 765, each of which has been previously discussed in more detail relative to FIGS. 5A-5D. In some embodiments, multiple sets of shortcuts can be assigned to multiple extended reality environments with each set of shortcuts corresponding to one extended reality environment.

The number of shortcuts made available to a user and the types of the shortcuts may be predetermined. For example, it may be predetermined that a given extended reality system has three arm button shortcuts, two gesture or hand pose shortcuts, three marking menu shortcuts, and one smart button shortcut, for a total of nine different shortcuts. The number of shortcuts may also be dynamically determined based on the one or more extended reality environments. For example, the number of arm button shortcuts may depend on the nature of an existing haptic device (e.g., FIGS. 4A-4C) or a predesigned virtual object that is available to the user, and the number of marking menu shortcuts may depend on the physical environment in which the user is present. Similarly, the design of the interaction user interface with marking menu shortcuts 755 that pops up when the thumb and index fingers of the user's hand are pinched together may depend on the motion of the user's hand. For example, a greater number of marking menu shortcuts may be generated when a large area drawn is by the user's thumb and index fingers versus a small area.

Each shortcut may be assigned a functionality or a task that is functionally equivalent to a plurality of functionalities. For example, as shown in FIG. 7B, a gesture shortcut 760 is assigned the functionality of playing the next song in group of songs. This might require only a single functionality (action) or a series of functionalities (actions). Initial assigned shortcuts may be predetermined. The initially assigned shortcuts may be assigned at random. For example, FIG. 7B illustrates three assigned shortcuts that are randomly assigned as virtual arm buttons 750. The initially assigned shortcuts may also be based on a set of functionalities triggered by the user in a time base. For example, the last functionality triggered/used by the user may be assigned as an initial shortcut. In this regard, the three marking menu shortcuts 755 sown in FIG. 7B may correspond to the last three functionalities triggered by the user. The initial assignments of shortcuts may be changed dynamically. For example, the smart button 765 of FIG. 7B may be assigned different functionalities over time depending on collected usage data of the user.

In some embodiments, the system does not provide default assigned shortcuts at the time of initial use of the system by the user. In such an embodiment, the initial assigned shortcuts are the optimal shortcut assignments determined from personalized usage data of the user and the estimated plurality of interaction times. The optimal shortcut assignments may be determined by a predictive model. The predictive model can output a prediction as to how different shortcut assignments will affect user performance or an ultimate goal, such as for example, achieving a least overall user interaction time.

In some embodiments, the predictive model is based on a graph-based model. In one example of a graph-based model, each node of the graph represents a state in the extended reality system (e.g., idle, task) and each directed edge represents an available functionality to transit from one state to another (e.g., an interaction). The estimated average interaction time of the user, as determined at block 620 of the process illustrated by the flow diagram 600 of FIG. 6, may be input to the predictive model as a weight of a directed edge.

FIG. 8 depicts an exemplary directed acyclic graph 800 that can be used in a predictive model. The graph 800 includes various vertices (or nodes) and edges. In FIG. 8, the nodes 805-835 of the graph 800 are represented by the ovals, while the arrows connecting the nodes represent directed edges. The boxes 840-875 in FIG. 8 represent the interaction types and costs associated with the connected nodes 805-835. The nodes 805-835 indicate each different application state in an exemplary music application. The curved-line edges represent assigned shortcuts between the nodes 805-835. Different algorithms (e.g., Dijkstra's Algorithm, Depth-First Search (DFS), Breadth-First Search (BFS), or the like) may be adopted by the predictive model to assign shortcuts, including new shortcuts.

The computational complexity associated with searching for optimal shortcut assignments can be extremely high, and finding an absolute optimal solution may not be possible under certain situations. In some embodiments, genetic algorithms may be used by the predictive model to overcome the computational complexity problem. Genetic algorithms are capable of finding optimal or near-optimal solutions to problems that are difficult to solve using traditional algorithms. The solution found by the genetic algorithms may be used as the optimal shortcut assignments by the extended reality system. In some embodiments, new mutations of the graph used by the predictive model may be generated by varying the assigned shortcuts and selecting as an optimal solution (e.g., a set of shortcuts) the solution where the shortcut assignments minimize the average interaction time with the extended reality system. Further details regarding optimal shortcut assignments are illustrated in Section 5. D below.

In some embodiments, the initial assignment of shortcuts may be updated and optimized using the predictive model, and optimal shortcut assignments determined based on the personalized usage data and the estimated interaction time may be used to assign shortcuts. The optimal shortcut assignments may be a set of shortcuts that achieve a least overall estimated interaction time with the extended reality system.

In some embodiments, the optimal shortcut assignments assign a set of shortcuts that optimize a function associated with design dimensions and/or design criteria of the extended reality system. In some embodiments, the optimal shortcut assignments are determined using a design space with a plurality of design dimensions and a plurality of design criteria. The design dimensions may comprise (i) visibility, (ii) agency, (iii) modality, (iv) availability, (v) personalization, or (vi) a combination thereof. The design criteria may comprise (i) performance, (ii) convenience, (iii) memorability, (iv) attention overload, (v) control, (vi) learning cost, or (vii) a combination thereof. Further details regarding the design dimensions and the design criteria are illustrated in Section 4.

The graphic user interface can be the same across the extended reality environments. In some embodiments, each extended reality environment has a graphic user interface, and different extended reality environments have graphic user interfaces that are specific to the corresponding environments. In some embodiments, the graphical user interface in the one or more extended reality environments comprises a sub-interface in each of the one or more extended reality environments.

In some embodiments, a second set of personalized usage data may be collected over a second period of time. The second set of personalized usage data may reveal whether the user has adopted a previous shortcut assignment, as well as usage rate/time associated with the shortcut. The second set of personalized usage data may further include a second set of functionalities that have been used by the user, a type of each functionality, a usage rate of each functionality, a usage time of each functionality, an environment associated with each functionality, and/or a time to complete a task associated with one or more functionalities in the second set of functionalities.

Adoption rate metrics associated with the optimal shortcut assignments may be determined using the second set of personalized usage data. Optionally, a plurality of updated interaction times for the user in the one or more extended reality environments can be determined, and each interaction time can be associated with a functionality that has been used by the user over the second period of time. Updated optimal shortcut assignments may be determined based on the adoption rate metrics, the second set of personalized usage data, and optionally, the plurality of updated interaction times. In some embodiments, a shortcut assigned according to the optimal shortcut assignments can be updated when an adoption rate metric associated with the shortcut fails a predetermined threshold. The graphical user interface can also be optimized and re-rendered based on the updated optimal shortcut assignments.

Execution of the feedback loop 630 indicated in FIG. 6 can be performed iteratively. For example, an nth set of personalized usage data may be collected over an nth period of time. The nth set of personalized usage data may comprise an nth set of functionalities that have been used by the user, a type of each functionality, a usage rate of each functionality, a usage time of each functionality, an environment associated with each functionality, and/or a time to complete a task associated with one or more functionalities in the nth set of functionalities. The nth set of personalized usage data may further identify whether the user has adopted a shortcut assignment in a last cycle (the (n−1)th cycle) and a usage rate/time associated with the shortcut.

A plurality of updated interaction times for the user in the one or more extended reality environments can be determined, and each interaction time may be associated with a functionality in the nth set of functionalities that have been used by the user over the nth period of time. Optionally, adoption rate metrics associated with the optimal shortcut assignments in the (n−1)th cycle may be determined using the nth set of personalized usage data. Updated optimal shortcut assignments may be determined based on the second set of personalized usage data, the plurality of updated interaction times, and optionally the adoption rate metrics. In some embodiments, a shortcut in the optimal shortcut assignments can be updated when an adoption rate metric associated with the shortcut fails a predetermined threshold. In some embodiments, a shortcut is updated when its adoption rate is less than 50%, 40%, 30%, 20%, 10%, or 5%. In some embodiments, the shortcut may be updated when its adoption rate is 0. The updated optimal shortcut assignments may be determined based on information in any of the prior cycles (from the first cycle to the (n−1)th cycle). For example, the optimal shortcut assignments can be updated based on at least one of the (n−1) sets of personalized usage data. The graphical user interface can also be optimized and rendered based on the updated optimal shortcut assignments.

4. Design Spaces for Shortcuts in Extended Reality Systems

To support the design and assignment of shortcuts in an extended reality system, a design space and a set of design dimensions can be used. A design space analysis may be conducted using, for example, a Questions, Options, Criteria (QOC) notation. In the context of designing and assigning shortcuts, it can be valuable to identify design dimensions (e.g., questions), relevant options for each dimension, and usability criteria impacted by design choices.

Figure 9:
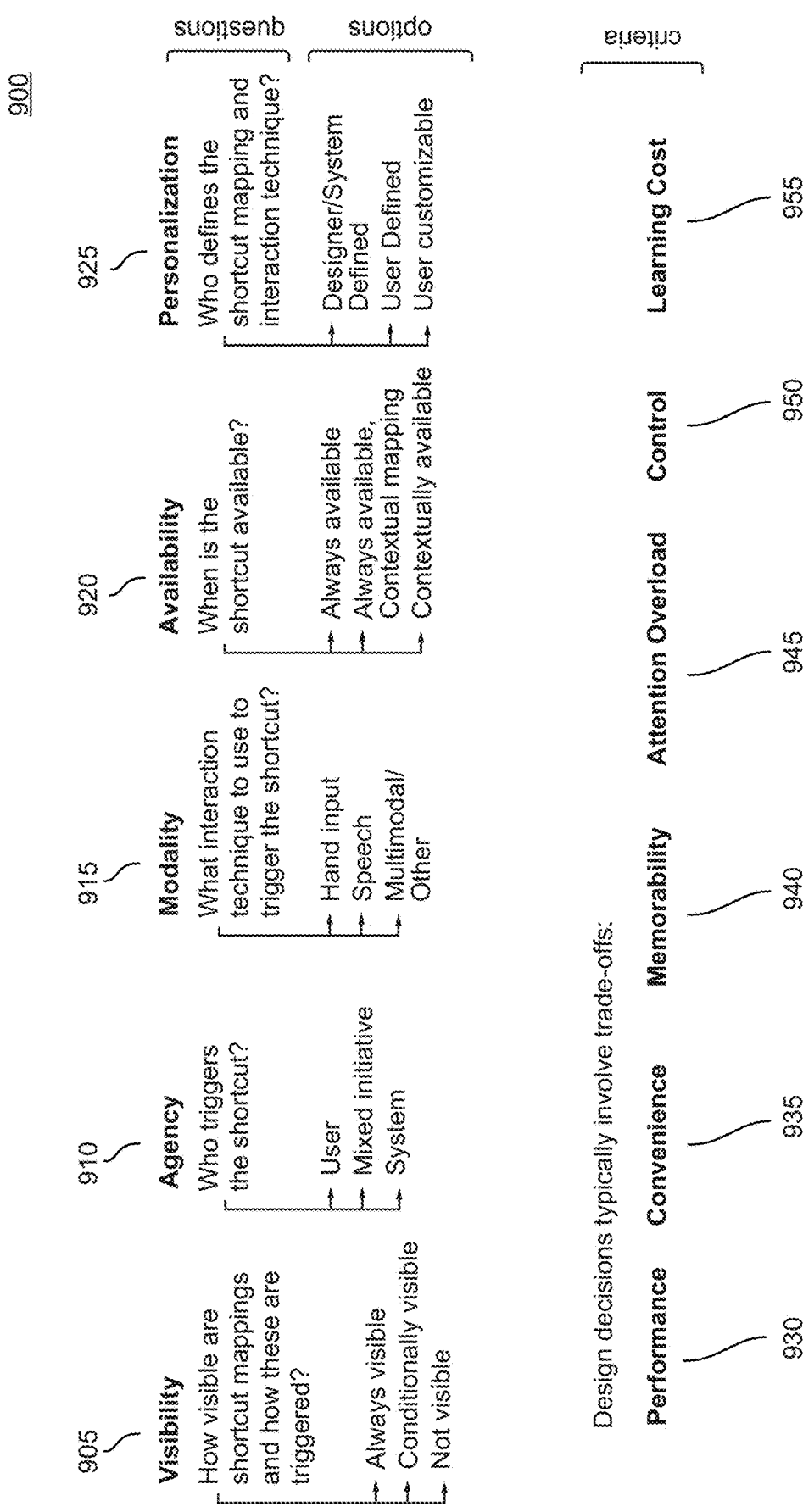
FIG. 9 illustrates an overview of a design space to support extended reality shortcut design and assignments using a predictive model in accordance with various embodiments.

FIG. 9 illustrates an overview of an exemplary design space 900 for supporting extended reality shortcut design and assignments using a predictive model. Five design dimensions and six design criteria are shown in the example of FIG. 9. A lesser or greater number of design dimensions and design criteria is possible in other embodiments. The design space 900 is suitable for adaption to various extended reality systems under different environments.

A. Design Dimensions

The first exemplary design dimension represented in FIG. 9 is visibility 905. In the context of shortcut design in an extended reality system, the visibility design dimension 905 identifies the extent to which the existence of a shortcut and the action it maps to are visible to a user. In the design space, there may be multiple different visibility classes.

Three visibility classes are represented in the example of FIG. 9. A first visibility class of the three visibility class examples is "Always Visible." When a shortcut is an Always Visible class shortcut, the user can see the shortcut and the action it maps to at any state while using the system. A second visibility class of the three visibility class examples is "Conditionally Visible." When a shortcut is a Conditionally Visible class shortcut, the user is able to see that the shortcut exists and the action it maps to only in specific system states or while performing a particular interaction technique. A second visibility class of the three visibility class examples is "Not Visible." When a shortcut is a Not Visible class shortcut, neither the existence of the shortcut nor the command it executes is visible to the user. Shortcuts of the "Not Visible" class variety can be learned through dedicated onboarding or can be customized by the user.

The second exemplary design dimension represented in FIG. 9 is agency 910. The agency design dimension 920 classifies which entity triggers the shortcut. Since extended reality experiences tend to have much more contextual information than, for example, PCs or smart phones, extended reality systems can leverage context to propose shortcuts or trigger shortcuts automatically based on customizable rules.

Three agency classes are represented in the example of FIG. 9. A first agency class of the three agency class examples is "User," which refers to the regular user who triggers a shortcut (e.g., pressing a hotkey). A second agency class of the three agency class examples is "Mixed-Initiative," which refers to shortcuts that execute after back-and-forth communication between the system and the user. For example, a system could suggest a shortcut to the user based on context, and the user can either trigger the shortcut or ignore the shortcut. A third agency class of the three agency class examples is "System," which refers to a shortcut that is triggered without any input from the user. For example, a System shortcut may be associated with a rule-based action.

The third exemplary design dimension represented in FIG. 9 is modality 915. The modality design dimension 915 defines how the user can execute a shortcut. Interaction techniques using different modalities are explored extensively in existing work, and the most prominent modalities are used in the design space in an extended reality system.

Three modality classes are represented in the example of FIG. 9. A first modality class of the three modality class examples is "Hand Input." Hand Inputs in the context of an extended reality system may encompass, for example, hand gestures, button presses, and other hand-based input techniques. A second modality class of the three modality class examples is "Speech." Speech interactions can allow users to execute trigger actions via voice commands. Speech interactions may be particularly useful when other interaction techniques are unavailable, but are not limited to use only in such situations. A third modality class of the three modality class examples is "Multi-modal/Others." Multi-modal/Other interactions may include gaze-based interactions, brain-computer interfaces, multi-modal interactions, and other interaction modalities. Multi-modal/Other interactions may currently be less widely used than hand input and speech interactions, but this may change in the future.

The fourth exemplary design dimension represented in FIG. 9 is availability 920. The availability design dimension 920 determines when a shortcut is available. There may be several factors to consider regarding availability. Two such factors may be the availability of the shortcut trigger (e.g., when can the user use the shortcut), and the action or state to which the shortcut is mapped (i.e., one shortcut can execute different actions or functionalities depending on context).

Three availability classes are represented in the example of FIG. 9. A first availability class of the three availability class examples is "Always Available." When a shortcut is an Always Available shortcut, the action or functionality to which the shortcut is mapped is always the same. A second availability class of the three availability class examples is "Always Available, Contextual Mapping." When a shortcut is an Always Available, Contextual Mapping shortcut, the user can trigger the shortcut at any time, but the action or functionality to which the shortcut is mapped is context-dependent. A third availability class of the three availability class examples is "Contextually Available." When a shortcut is a Contextually Available shortcut, the user can trigger the shortcut, or the command associated with the shortcut can automatically execute in specific contexts.

The fifth exemplary design dimension represented in FIG. 9 is personalization 925. The personalization design dimension 925 defines the ability of the user to customize how a shortcut is triggered and the command(s) that is executed upon triggering of the shortcut. It has been shown that user-defined gestures are easier to memorize, which suggests there may be benefits to supporting personalization in the course of shortcut design. Furthermore, designing shortcuts that allow users to customize the actions to which the shortcuts are mapped gives more control to the user.

Three personalization classes are represented in the example of FIG. 9. A first personalization class of the three personalization class examples is "User-defined." When a shortcut is a User-defined shortcut, the user can define how the shortcut is triggered, such as by defining new gestures or speech commands, and can also define the action performed as a result of triggering the shortcut. A second personalization class of the three personalization class examples is "User-customizable." When a shortcut is a User-customizable shortcut, the user can customize what action the shortcut invokes when triggered. A third personalization class of the three personalization class examples is "System/Creator-defined." When a shortcut is a System/Creator-defined shortcut, the system or the creator can define the shortcuts, and the user cannot customize the shortcuts.

Various types of shortcuts are listed below in Table 1, along with different options that may be associated with each shortcut in the five exemplary design dimension described above.

TABLE 1

|  | Visibility | Agency | Modality | Availability | Personalization |
| --- | --- | --- | --- | --- | --- |
| Arm Buttons | Always visible* | User | Hand Input (poking) | Always available* | System/Creator-defined* |

TABLE 1-continued

|  | Visibility | Agency | Modality | Availability | Personalization |
|---|---|---|---|---|---|
| Gestures | Not visible | User | Hand Input (gesture) | Always available | User Customizable* |
| Marking Menu | Conditionally visible | User | Hand Input (gesture)* | Always available | System/Creator-defined* |
| Smart Button | Always visible | User* | Hand Input (poking) | Always available, contextual mapping | System/Creator-defined* |
| User-Defined automations | Not visible | Mixed-Initiative* | Multi-modal/ Others | Contextually available | User-defined* |

*indicates options that are implementation dependent.

It should be understood that the design dimensions identified in FIG. 9 are not an exhaustive list. In some embodiments, more design dimensions can be added to a design space. In some embodiments, certain ones of the design dimensions identified in FIG. 9 can be omitted. Likewise, the exemplary classes associated with each design dimension in FIG. 9 are not intended to be limiting. In some embodiments, a greater or lesser number of design classes may be associated with the exemplary design dimensions. Weights may also be assigned to design dimensions or classes in some embodiments.

B. Design Criteria

Design criteria are relevant to optimization. For purposes of illustration, six exemplary design criteria are presented in the example of FIG. 9 for consideration during the process of shortcut design and assignment. The first exemplary design criterion identified in FIG. 9 is performance 930. The performance design criterion 930 can consider how efficiently the user can trigger the shortcut. The second exemplary design criterion identified in FIG. 9 is convenience 935. The convenience design criterion 935 can consider user difficulty associated with use of a shortcut. The third exemplary design criterion identified in FIG. 9 is memorability 940. The memorability design criterion 940 can consider user difficulty associated with remembering how to execute a shortcut and the respective command or functionality associated with the shortcut. The fourth exemplary design criterion identified in FIG. 9 is attention overload 945. The attention overload design criterion 945 can evaluate how the existence of a shortcut affects the attention of a user. The fifth exemplary design criterion identified in FIG. 9 is control 950. The control design criterion 950 can evaluate customization possibilities if a shortcut is enabled, how the shortcut is triggered, and the command executed upon triggering of the shortcut. The sixth exemplary design criterion identified in FIG. 9 is learning cost 955. The learning design criterion 955 can estimate user difficulty associated with learning how to use a shortcut and the action performed as a result of triggering the shortcut.

Design decisions may involve trade-offs between design criteria that affect shortcut usability. For example, allowing a user to customize what hand poses trigger a shortcut can result in more user control and memorability. However, allowing such a user customization can also result in lower performance if the customization compromises how accurately the system predicts which gesture the user will perform. Such trade-offs can be considered during shortcut assignment optimization, as is described in more detail below.

5. A Predictive Model for Shortcut Design and Assignments

As described above, extended reality systems can support multiple shortcut interactions, each with varying characteristics, capabilities, and learning costs. For example, an interaction using an arm button that is always visible and requires no memorization, has a relatively low corresponding learning cost. Conversely, an interaction using a gesture that is "not visible" according to the previously described visibility design dimension and requires initial user learning or customization, has a relatively high corresponding learning cost. Appropriately designing and assigning shortcuts to functionalities can be a challenging problem, especially in view of the number of possible combinations. For example, if there are 10 possible shortcuts and 100 interactions or tasks that can be associated with each shortcut, the total number of possible solutions is $100^{10}$. That is, there are 10 quintillion possible solutions in the exemplary search space, and it would be impractical to search the entire space using exhaustive methods even with a computing system. Further, in reality, interaction numbers may vary and are usually much greater than 100, which makes it even more impractical and inefficient to search the entire solution space.

Accordingly, various embodiments may utilize a predictive model to perform shortcut design and assignment in an extended reality system. The predictive model may take consideration of a design space with design dimensions and design criteria to optimize shortcut design and assignments. The predictive model may be constructed using a genetic algorithm and may be taught to compute interaction time with a given design that specifies available functionalities for selecting tasks. Genetic algorithms can be used to efficiently explore the design space and determine optimal solutions by using techniques such as selection, crossover, and mutation. Through optimization, shortcut assignments can be determined that will provide an improved performance for a particular user, based on prior interactions of the user.

A. Assessing How Shortcuts Affect Interaction Time

In order to identify shortcuts that will result in better user performance, specific shortcut combinations should be assessed to determine how they affect interaction time and performance for a given user. Existing approaches to user interface adaptation in non-extended reality environments often use model-based simulations to predict the adaptation utility, such as by estimating costs like inspection, selection, and correction. However, such simulations may be inaccurate for individual users. Accordingly, techniques disclosed herein capture actual usage data for users, and use the data to determine interaction times and user interest in given shortcuts that can serve as input to shortcut optimization. For example, in some embodiments, an average time required for a user to go from one state to another using a specific interaction path (sequence of functionalities) can be calculated and used as an indicator of the cognitive and motor costs of that interaction path. In some embodiments, user interest may be captured as a function of how frequently the user reaches each application state. The captured data can also be used for the purpose of constructing a better predictive model. Further, by using actual personalized usage data, the present techniques are able to compute a better user performance estimation and provide an improved extended reality system for individual users.

As described above, a directed acyclic graph structure may be used to store personalized usage and interaction data in some embodiments. For example, referring back to the acyclic graph 800 of FIG. 8 as an example, each different application state 805-835 in a music application is a vertex, while actions that are relevant for the user independently of the application state are a vertex as well (e.g., play jazz 835). The structure of a directed acyclic graph makes it easy and efficient to store user interaction data. In some embodiments, the time required for the user to go from one vertex to another in a list for its correspondent edge is stored, making it trivial to compute the average cost of taking that path, the number of vertex visits, and the usage rate of a shortcut. Other data may also be stored and considered during graph construction.

B. Computing the Interaction Time of a Vertex.

When operating an extended reality system, users may not always take the fastest route to achieve a task for multiple reasons. For example, it may be inconvenient for a user to utilize the fastest route, or the user may have simply forgotten the shortcut. A number of methods may be used to compute an interaction time of a vertex (node) in the acyclic graph structure. According to one such method, the optimal interaction time may be used to compute the interaction time for the node, where the optimal interaction time is the fastest interaction path by which the user can reach the node (considering availability). According to another method, the user's interaction time can be used, compute the interaction time for the node, where the user's interaction time estimates the cost of the user's usage rate of each shortcut.

To compute the interaction time of a vertex in a given acyclic graph structure according to some embodiments, consider Ae as a probability of an event (or task) where an edge e is an available path that can be taken by a user. The availability of the edge e should be known when computing the interaction time of a vertex because in a design space, such as the exemplary design space shown in FIG. 9, some shortcuts might only be conditionally available. A usage rate ue of an edge cab be defined as a probability Ie of the user taking the edge e when the edge e is available, and can be represented by the equation:

$$u_e = P(A_e) \cap P(I_e | A_e) \quad \text{Equation A}$$

Shortcut availability is typically easy to capture from usage data since the extended reality system will know the user vertex visits and corresponding availability. For example, the extended reality system can capture what action a shortcut (e.g., smart button) was suggesting when the user visits a specific vertex.

In some embodiments, the interaction time required for the user to reach a vertex cr of a graph structure on a path that goes from a vertex p to a vertex k through the edge e can be computed by summing an average time of that edge ce with the time of its direct predecessor vertex cp, as may be represented by the equation:

$$C_{r\{p,k\}} = c_e + c_p \quad \text{Equation B}$$

Using the notation where {i: j, k} represents all incoming edges from the vertex k and i: j are all its direct predecessor vertices, an interaction time of k can be determined according to the following equation:

$$c_k = \Sigma_{n \in \{i:j,k\}} A_n \cdot u_n \cdot c_{r\{n\}} \quad \text{Equation C}$$

where $c_n$ may be computed recursively and users may use a specific edge to reach a vertex, and an edge availability may be updated over time in a sample space (i.e., a set of all possible outcomes of an event) of the predictive model. To avoid inconsistencies where the sample space could be different from 1, $u_{\{i:i,k\}}$ can be normalized resulting in the equation:

$$\Sigma_{n \in \{i:j,k\}} u_{\{n\}} = 1 \quad \text{Equation D}$$

Computing the optimal interaction time $u_e$ in the graph structure may be accomplished by taking the value of 1 for the edges with the lowest cost until the sample space Ω is equal to 1.

C. Computing the Overall Interaction Time for a Graph

To assign shortcuts optimally, it is beneficial to determine if a given combination of shortcuts is better than another combination. To achieve an optimal assignment, the interaction time of the graph can be computed and compared, with consideration for how frequently the user visits each application state. Because users might use functionality in an application continuously, for example by navigating multiple websites in a browser application without exiting the browser application, application visit interactions may be collected and counted as a single visit to the application vertex without registering visits to actions.

To estimate how a new shortcut(s) can reduce the interaction time, an average time taken by the user to use that type of shortcut may be used as its temporary edge cost. Furthermore, the usage rate of existing shortcuts can serve as heuristic usage rates of new shortcuts. When assigning first shortcuts in a graph, optimal interaction time may be assumed to propose shortcuts that can result in the greatest possible interaction time reduction. An interaction time of a graph g in the graph structure can be determined using the following equation:

$$c_g = \Sigma_{n \in f} v_n \cdot c_{r\{n\}} + \Sigma_{n \in a} v_n \cdot c_{r\{n\}} \quad \text{Equation E}$$

where f is a set of vertices that represent final actions, a is a set of application vertices, and v is the visit frequency to the application vertices.

D. Optimizing Shortcut Assignments

In some embodiments, shortcut assignment optimization can be achieved by comparing the interaction time of several interaction graphs having different combinations of shortcuts and selecting the graph with the lowest interaction costs. A graph with lower interaction times (and lower interaction costs) may result from adding a higher number of new shortcuts. However, a higher number of shortcuts also typically results in a higher learning cost to the user. Thus, there is a trade-off between interaction cost and learning cost, which presents a multi-objective optimization problem. In some embodiments, this problem can be dealt with by determining or approximating a Pareto-optimal set in which each shortcut combination has the lowest interaction time possible for its corresponding number of shortcuts.

In some embodiments, a genetic algorithm can be used to optimize shortcut assignments and GUI designs with multiple objectives. In some embodiments, the genetic algorithm may be a Strength Pareto Evolutionary Algorithm 2 (SPEA2) algorithm that can be tailored to solve the multi-objective optimization problem resulting from the trade-off between interaction cost and learning cost. In some embodiments, a solution (chromosome) provided by the genetic algorithm can be an interaction graph. Interaction graphs can contain different shortcuts. However, what distinguishes one chromosome (interaction graph) from another are the edges in the graphs, which represent shortcuts between vertices (system states or actions). In some embodiments, a tailored genetic algorithm (e.g., a tailored SPEA2 algorithm) may execute at least the following steps.

Step 1: Initialization. An initial population may be generated only with interaction graphs containing one shortcut. To avoid duplicates and more efficiently find good solutions, all vertices in an existing graph may be sorted by their interaction time (e.g., from highest to lowest) and chromosomes may be created with their respective shortcuts until the desired population size is reached.

Step 2: Fitness assignment. For each solution (e.g., chromosome or interaction graph) in the population, the genetic algorithm evaluates its fitness based on an overall interaction time of the interaction graph and assigned thereto. For example, interaction graphs exhibiting greater interaction time reductions may receive higher fitness scores. There may be a single interaction graph that exhibits a greater interaction time reduction than the other interaction graphs to which it is compared, and the interaction graph that exhibits the greatest interaction time reduction may receive the highest fitness score.

Step 3: Environment selection. The environmental selection determines which solutions will be preserved in the population for the next generation. In some embodiments, the solutions are sorted into several levels of non-dominated solutions, creating a Pareto front. In the Pareto sorting substep, the solutions in the current population are categorized into different levels based on their non-domination relationships. Solutions that are not dominated by any other solution are placed in the first level. Solutions that are dominated by only the solutions in level 1 are placed in the second level, and so on. Each solution may be assigned a strength value, which reflects how many solutions it dominates. The strength of a solution is calculated as the sum of the raw fitness values (number of solutions it dominates) of all the solutions that it dominates. Solutions with higher strengths are considered more influential in the population. The top solutions from each level of a Pareto front are selected to form the next generation. The size of the archive (the number of solutions to be preserved) is typically predefined. Each solution may also be assigned a density estimate, which measures the density of solutions around it in the solution space. The density of a solution may be calculated as the reciprocal of the Euclidean distance to its k-nearest neighbors, where k is a user-defined parameter. Solutions in denser regions have higher density estimates. In some instances, a crowding distance is also calculated for each solution within the same level. The crowding distance measures how close a solution is to its neighboring solutions in the objective space. Lastly, in the environmental selection step, solutions are selected for the next generation based on their Pareto ranks, strengths, and density estimates. Initially, the archive (a predefined size limit) is filled with solutions from the first level of Pareto sorting. If there are more solutions in the first level than can fit in the archive, the solutions with the lowest crowding distances are selected to ensure diversity. If the archive is not fully populated with the first-level solutions, solutions from the second level are added, following the same crowding distance criteria. This process continues until the archive is filled or no more non-dominated solutions can be added without exceeding the archive size. The environmental selection process is important for maintaining a balanced and diverse population of non-dominated solutions.

Step 4: Mating selection. In some embodiments, the genetic algorithm can employ tournament selection with replacement to fill a mating pool. In some embodiments, the tournament selection may not be limited to two chromosomes. In one non-limiting example, the tournament size may be set to 10.

Step 5: Reproduction and Variation. The variation step in SPEA2 involves the creation of new candidate solutions through the application of genetic operators, namely crossover and mutation. This step is important for evolving the current population, introducing diversity, and exploring new regions of the solution space. In the present genetic algorithm, the variation step is performed similar to SPEA2, but preferably with implementation of a recombination operator and a mutation for interaction graphs. Crossover is a genetic operator that combines the characteristics of two parent solutions to produce one or more offspring solutions. Typically, two parent solutions are selected from the current population. The selection of parents can be based on various criteria, such as fitness or diversity. Crossover points are chosen on the parent solutions' representations (e.g., binary strings or real-valued vectors). Offspring solutions are created by exchanging the genetic information between the parents at these crossover points. The number of offspring produced may vary, but it is typically two in most cases. With respect to cross-over for the present genetic algorithm, two chromosomes may be combined by initially listing all the shortcuts present in both chromosomes. Duplicate shortcuts may be ignored. Each shortcut in the list may be thereafter added to a new chromosome with some assigned probability p. For example, and without limitation, the probability p may be 40%. Randomizing of shortcuts may also be performed. Randomizing the shortcuts that are to be added to the new chromosome may allow the optimization process to explore more solutions and avoid getting stuck in a local minimum.

Mutation is another genetic operator that introduces random variations into a solution. This helps to explore new areas of the search space and escape local optima. For each offspring produced through crossover, a mutation operation may be applied with a certain probability. The mutation can vary the values of specific solution components (e.g., flipping a binary bit or adding a random value to a real-valued parameter). The probability of mutation is usually a user-defined parameter, and it controls the extent to which solutions are perturbed by random changes. In one non-limiting example, one mutation is supported. During the variation step, the genetic algorithm may randomly select a shortcut, but may prioritize vertices with higher interaction times using a geometric distribution. An edge may also be added to a vertex in the chromosome that does not contain a shortcut.

After the crossover and mutation steps, recombination is performed to add the offspring solutions to the population (i.e., merging the offspring solutions with the existing population). In some instances, during the recombination, the population size is maintained as constant, so if new solutions are added, the environmental selection step may be used to select a subset of the best solutions to keep the population size within limits.

Step 6: Termination. The genetic algorithm may be executed until a predetermined maximum number of generations T is reached. The predetermined maximum number of generations may be customized and can be based on a user need. The maximum number of generations may also be a default value. In one experimental example, good results were obtained when exploring solutions for up to eight shortcuts when the maximum number of generations value T was set to 50.

6. Examples

To evaluate the optimization approach embodiments described above and to learn more about user preferences and usage of different shortcut designs, a small-scale user study in VR was conducted. The user study was followed by an analysis of how successfully the predictive model and the optimization method predict interaction costs using user data.

A. Study Design

In the user study, participants used different shortcuts and executed a series of tasks. The user study was directed to making two determinations: (i) how the optimization approach performs compared to a baseline approach in terms of user performance, and (ii) the users' preferences and opinions relative to different extended reality shortcut designs.

The study consisted of 15 participants (9 male, 6 female), aged 22 to 46 (M=32.5, SD=7.15), with varying educational backgrounds. When asked to rate their experience with virtual reality (1—never used before to 7—use it daily), the average participant rating was 3.6 (SD=1.45).

Figure 10A:
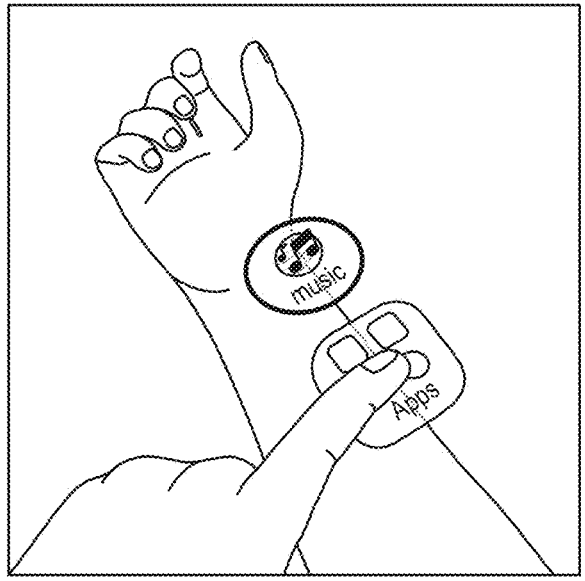
FIG. 10A illustrates an arm button shortcut interface in accordance with various embodiments.
Figure 10B:
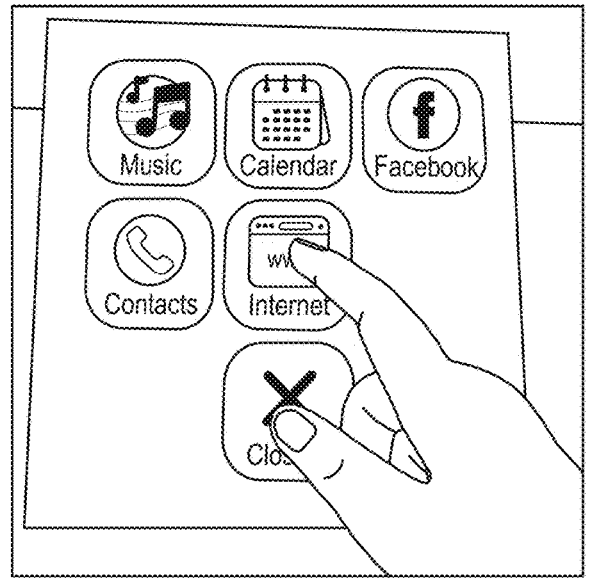
FIGS. 10B-10D show three associated graphic user interfaces that can be triggered by the arm button shortcuts shown in FIG. 10A, in accordance with various embodiments.
Figure 10C:
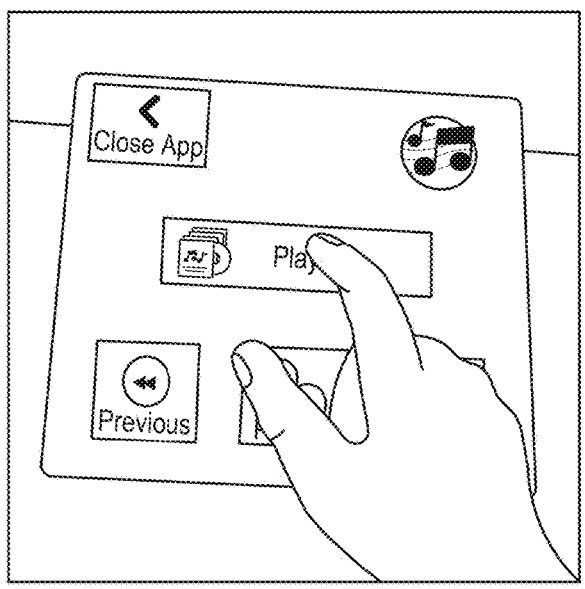
Figure 10D:
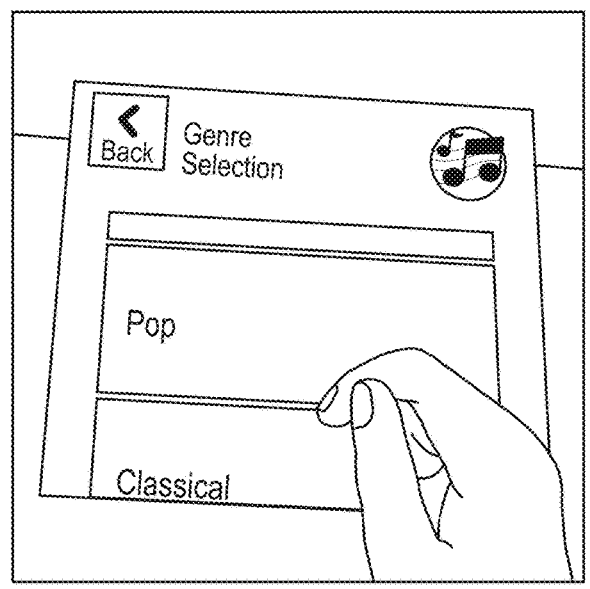

During the study, participants performed 75 tasks in each of several system conditions to simulate real interactions in a VR environment. For example, the participants were asked to, among other things, call a closest relative, play a pop music playlist, and continuously use a browser. The VR experience was created for purposes of the study by a system with a VR headset and using applications that commonly exist in smartphones. For example, as represented in FIGS. 10A-10D, study participants were presented with a music player, contacts for calling and texting, a social media application, a calendar, and a browser. All interactions in the system used hand inputs (poking interactions with virtual buttons and gestures). Four types of shortcuts were made available during the study—arm buttons, gestures, a marking menu, and a smart button. The VR system in the study supported three arm buttons, two gestures, one marking menu with three options, and one smart button that proposed shortcuts to open applications. Participants could open a menu presenting all the applications using a button on the right arm, as illustrated in FIG. 10A. Participants were also able to press a button to receive new tasks, and could also observe a panel to see what task must next be accomplished in order for the user to proceed.

So that each participant solved a different problem, and to provide a personalized user experience, the tasks received by each participant were generated based on a persona created for each participant at the start of the study. The persona for a given participant was based on the answers provided by the participant to a series of questions. The questions included, for example, asked how frequently the participant typically uses each application (e.g., on their smartphone), the participant's musical preferences, and the people the participant contacts the most. A semi-random algorithm was then used to generate a list of tasks for the participant to complete based on the participant's answers. The same set of tasks was used across conditions, thereby randomizing the task order.

During the study, each participant was asked to perform their assigned tasks under four separate shortcut conditions. The first condition was always Calibration, where no shortcuts were provided. At the Calibration condition stage, participants donned the VR headset and got familiar with navigating the applications and menus. After completing 75 tasks under the Calibration condition, there was a short introduction to the four types of shortcuts (i.e., arm buttons, gestures, marking menu, and smart button) available for use in the system during various phases of the study.

Subsequent to performing tasks under the first, Calibration condition, users were asked to perform tasks under three other shortcut conditions: "No Shortcuts,", "Baseline," and "Optimized," in that order. Each of these three shortcut conditions was counterbalanced using a Latin square.

As the name describes, the No Shortcuts condition provided the users with no shortcuts for interacting with the VR system while performing the tasks. The No Shortcuts condition is essentially the same as the Calibration condition, but also allowed for the ability to compare participant performance with shortcuts available for use versus participant performance with no shortcuts available for use, without the disadvantage that Calibration is always the first condition.

The Baseline shortcuts condition was designed to assign commands to shortcuts, where an interaction graph was used to compute the accumulated time (cost) required by each participant to reach each vertex of the interaction graph. Thereafter, shortcuts to the vertices of the interaction graph with the highest costs were greedily assigned.

The Optimized shortcuts condition was generated using a predictive model and the shortcut optimization and assignment approach previously described in Section 5 above.

Command assignments were prioritized to different shortcut types with the understanding that most users have preference for shortcuts in the form of arm buttons, followed by marking menus, and then gestures. Shortcut mappings that would likely result in lower interaction costs were assigned to the arm buttons first, then to the marking menu, and finally to gestures. During the study, the smart button was permitted to suggest applications only. Further, an intelligent agent was emulated that could predict user intentions with different levels of accuracy for each application in the VR system. Most participants did not require more than 15 minutes to complete each trial, and the participants answered a short questionnaire between shortcut conditions (with the opportunity for a break). At the end of the study, the participants completed a more thorough questionnaire and were given the opportunity to provide feedback.

B. Study Results

The results of the participant study are described below.

i. Efficiency

Figure 11B:
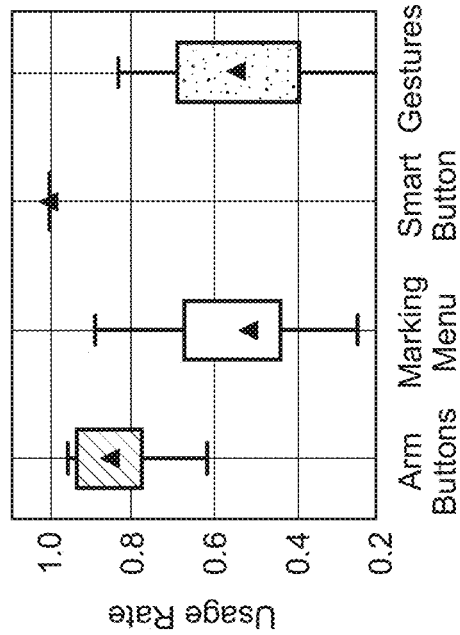
FIG. 11B graphically illustrates usage rate per shortcut type in the study in accordance with various embodiments.
Figure 11A:
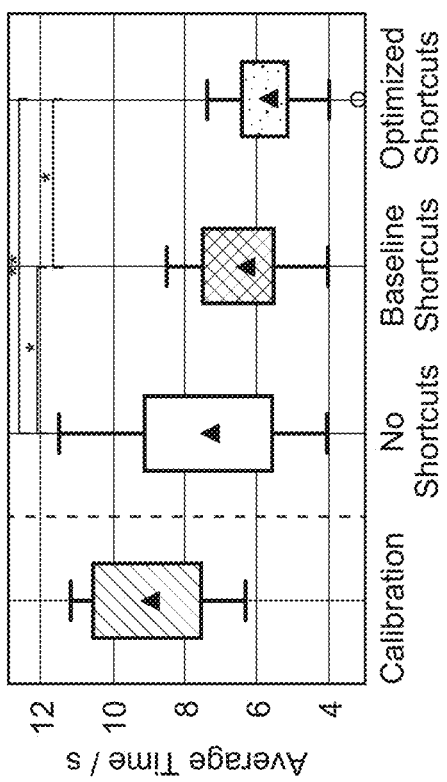
FIG. 11A graphically illustrates an average time for participants to complete a task for each of several shortcut conditions in a study in accordance with various embodiments.

FIG. 11A graphically illustrates an average time required for the participants to complete a task for each shortcut condition in the study. Significant effects from a Post-Hoc Pairwise test are indicated by * ($p<0.05$) and ** ($p<0.01$). Efficiency—the speed with which the participants completed the tasks under each shortcut condition—was analyzed. Participant efficiency was the lowest under the Calibration condition, as expected given that the participants interacted with the VR system for the first time under the Calibration condition. As may also be observed from the graph of FIG. 11A, the participants achieved a 12% speed increase on average when performing the study tasks under the Optimized condition versus the Baseline condition, and the participants achieved a 29% speed increase on average when performing the study tasks under the Optimized condition versus the No Shortcuts condition. These results indicate how shortcuts can improve user performance, even with learning costs considered and a small trial consisting of only 75 tasks.

After performing the tasks under each shortcut condition, the participants are asked to rate the quality of the commands assigned to each shortcut (with 1=very low; and 7=very high). The average participant rating for the commands assigned to each shortcut under the Baseline shortcut condition were M=5.2; SD=0.86. The average participant rating for the commands assigned to each shortcut under the Optimized shortcut condition were M=4.9; SD=1.10. Interestingly, participants gave a similar rating to each of the Baseline and Optimized conditions, but consistently performed the study tasks more efficiently under the Optimized condition. Application of a Friedman test indicated a statistical significance of p<0.01 across the shortcut conditions. Considering that a persona was created for each participant and that each participant already performed all the tasks at least once under the Calibration condition before performing the tasks again under the No Shortcuts, Baseline, and Optimized shortcut conditions, it is possible that the participants were unsure which shortcuts resulted in lower overall interaction costs.

ii. Shortcut Usage Rate

FIG. 11B illustrates participant usage rate per shortcut type while performing the tasks during the study. To assess the usage rate of each shortcut supported in the study VR system, only shortcut usages where use of a given shortcut to perform a given task would be optimal (i.e., would result in the shortest path to the vertex corresponding to the task) were considered. As illustrated in FIG. 11B, the study results indicate that the smart button shortcut had a 100% usage rate. It is possible that such a high usage rate can be attributed to design choices related to smart button placement. More specifically, as mentioned earlier, the smart button only suggested shortcuts to an application root (e.g., open music, or open contacts). When using the smart button was the optimal choice, the only sub-optimal option would have been to open the application through the main menu (that contains all the applications). As the smart button was located next to the main menu button (a deliberate design choice for purposes of the study), even if a participant planned to open the main menu, they would see the smart button suggestion. The arm buttons proved to be the shortcut type with the next highest usage rate (M=85.2%, SD=10.1%). This was not surprising given that the arm buttons were always visible, while the marking menu and gestures shortcuts had less visibility. The gestures shortcut type followed the arm buttons in popularity (M=54.4%, SD=21.8%), while the marking menu proved to be the least used shortcut type amongst the study participants (M=51.4%, SD=25.6%). Given that the marking menu shortcut is conditionally visible, and the gestures shortcuts are never visible, it is possible that the gesture shortcut usage rate was higher than the marking menu usage rate because the gestures shortcut type allowed for user-customizable command mappings.

iii. Shortcut Speed

Figure 11C:
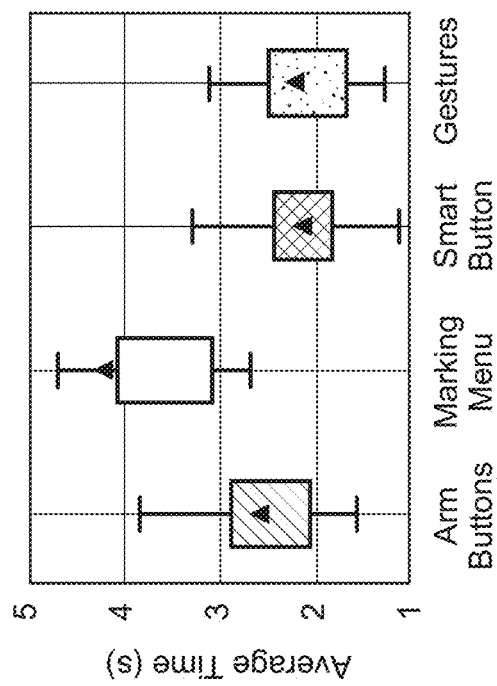
FIG. 11C graphically illustrates an average interaction time per shortcut in the study in accordance with various embodiments.

An average participant interaction time per shortcut—i.e., how quickly the participants were able to use each type of shortcut—was also measured during the study. As is graphically illustrated in FIG. 11C, the participant interaction time with each of the arm button shortcuts, smart button shortcuts, and gestures shortcuts, was similar on average, although the arm button interaction time was slightly longer. Participant interaction time was the longest for the marking menu shortcut, which may be because the marking menu requires a "composite" interaction, and some participants may have experienced marking menu gesture recognition issues.

iv. Workload

The study participants also rated task workload under each shortcut condition. The participant ratings indicate that the physical demand and effort required when performing the study tasks using the Optimized shortcuts is less than the physical demand and effort required when performing the study tasks using no shortcuts. Based on the participant ratings, the reduction in physical demand and effort is statistically significant. It can thus be appreciated that the use of shortcuts reduces interaction time overall, and also reduces motor costs.

v. Shortcut Feedback

Figure 12:
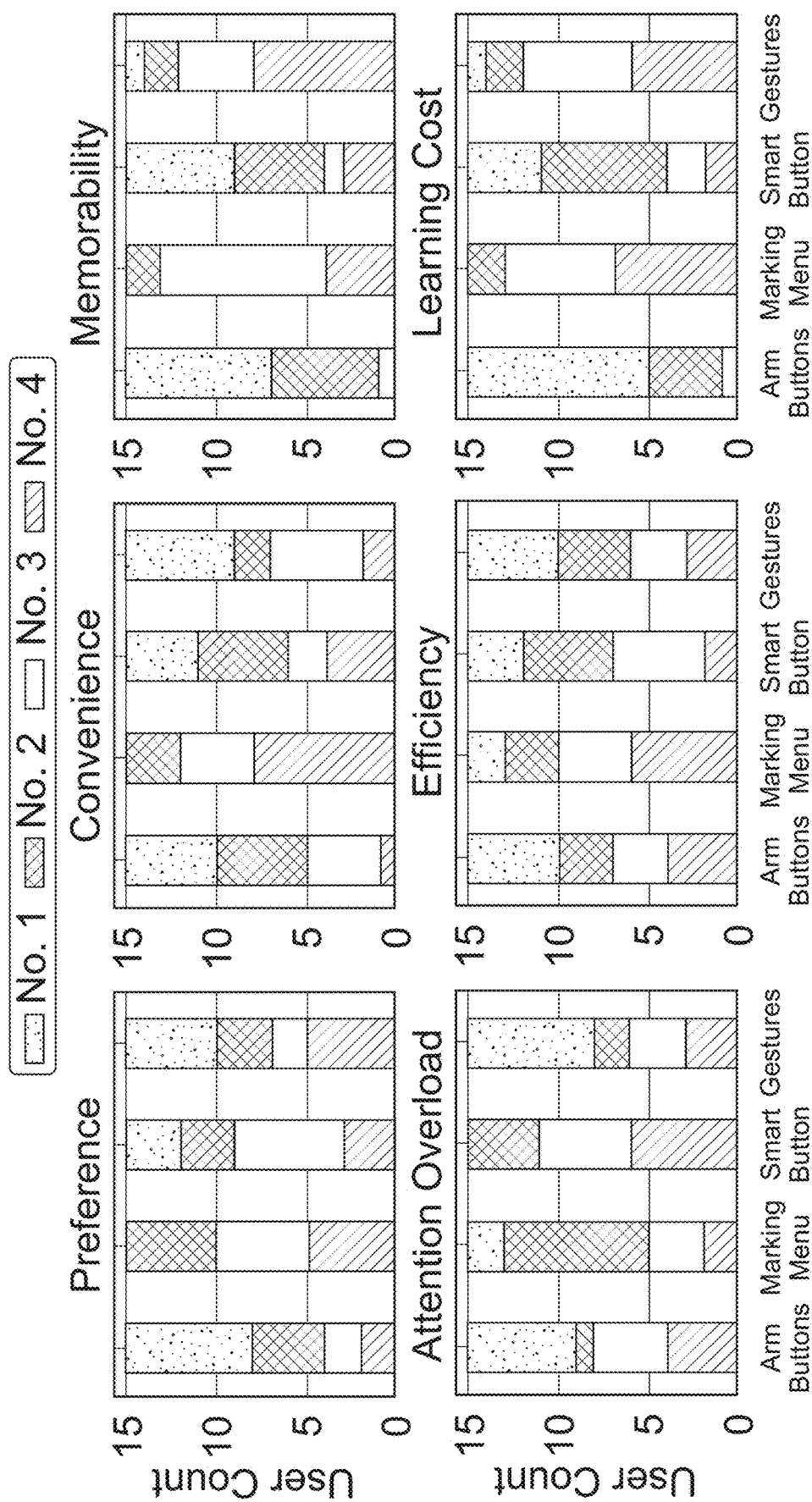
FIG. 12 graphically illustrates a summary of participant feedback relative to the study in accordance with various embodiments.

Participant feedback provided at the end of the study regarding the shortcuts in the system was used to rank each shortcut in terms of preference (most preferred first), convenience (most convenient first), memorability (easiest to memorize first), attention overload (lowest overload first), efficiency (most efficient first), and learning cost (easiest to learn first). As is graphically illustrated in FIG. 12, the participant feedback indicated that the arm buttons were the shortcut most preferred overall, with most participants reporting it as having the lowest learning cost and being easier to memorize. FIG. 12 also suggests the potential value in allowing users to choose between different types of shortcuts.

When asked to rate the effectiveness and convenience of each shortcut (1—very low, 7—very high), the participants gave high ratings to all the shortcuts available in the system during the study with the arm buttons shortcut receiving an average rating of (M=5.5; SD=1.0), the marking menu shortcut receiving an average rating of (M=4.8, SD=1.3), the smart button shortcut receiving an average rating of (M=5.0, SD=1.0), and the gestures shortcut receiving an average rating of (M=5.5; SD=1.0). At the end of the study, the participants were further asked to rate the relevance of shortcuts in everyday AR scenarios, where they would perform similar tasks to the ones in the study (1—very low, 7—very high). The participants rated shortcuts to be of high importance on average (M=6.4, SD=0.9).

vi. Ranking of Design Space Criteria

Figure 13:
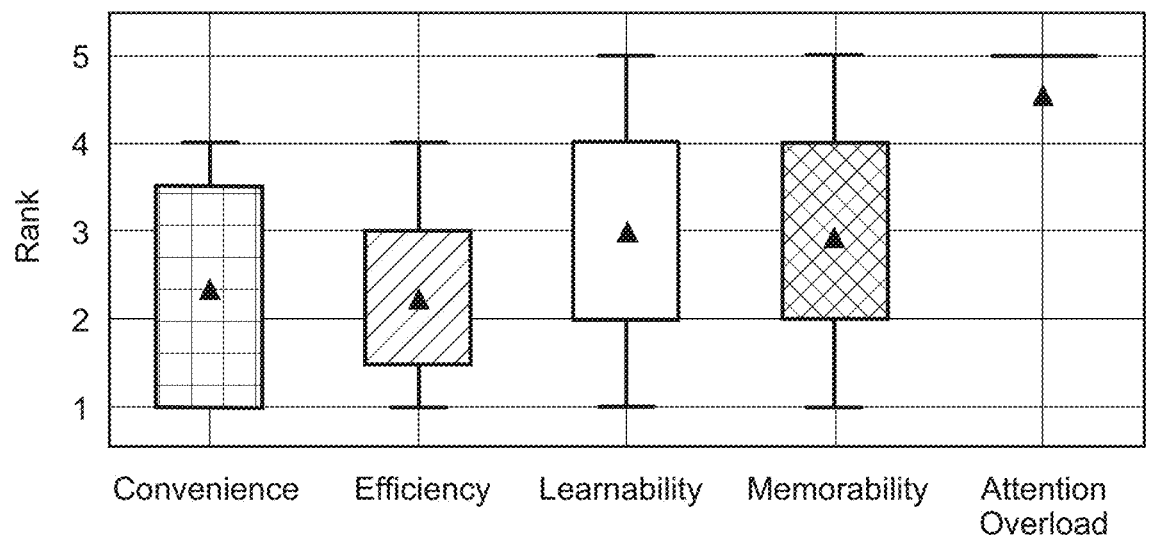
FIG. 13 graphically illustrates an average participant rank of importance for shortcut design criteria in the study in accordance with various embodiments.

The study participants were also asked to rank the design space criteria by order of importance. This ranking is graphically presented in FIG. 13. As indicated, both convenience and efficiency ranked high, followed somewhat closely by learnability and memorability, while attention overload ranked as the least important factor. Based on participant comments, the ability to personalize shortcut mappings and to create customized gestures may be beneficial/desirable criteria to be include in the design space.

C. Ablation Study

An ablation study was conducted to assess how well the computational approach predicts the interaction cost and the difference between the optimization approach and the baseline used in the study. To analyze how using a genetic algorithm impacts the quality of solutions, a secondary greedy approach was also used. The greedy approach utilizes the interaction cost of each node instead of accumulated time on each node. The only data generated at this stage was the data associated with the user interactions that occurred under the Calibration shortcut condition, and the overall usage rate of each shortcut. In realistic settings, it is possible to collect usage rates once there are shortcuts in the system.

Figure 14:
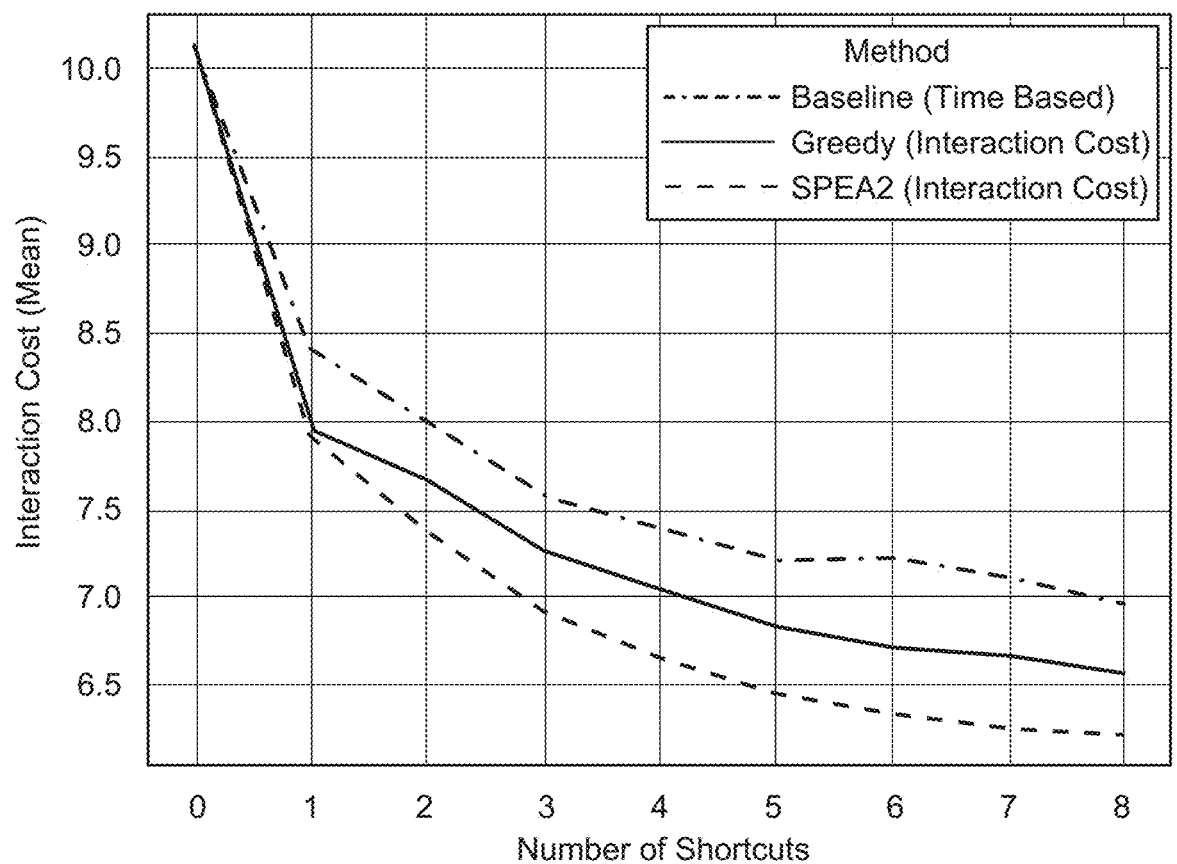
FIG. 14 graphically illustrates a mean interaction cost per task for different optimization methods in accordance with various embodiments.

As can be observed in FIG. 14, eight shortcuts were assigned during the ablation study, and the predicted mean interaction time output by the predictive model tracked very closely with the data obtained from the ablation study. For example, the interaction time for the Baseline shortcut condition was predicted to be 6.4 seconds, and the actual time in the study was 6.5 seconds. Similarly, the interaction time for the Optimized shortcut condition was predicted to be 6.25 seconds, and the actual time in the study was 5.64 seconds. These results indicate that the optimalization approach described herein can closely predict the interaction cost reduction that results from adding specific shortcuts to an extended reality system. Moreover, the theoretical difference between the greedy approach using the predictive model is significant compared to the optimization method using a genetic algorithm (i.e., around 5%), highlighting its relevance.

It is also be observed in FIG. 14 that the slope of each graphed line becomes less as more shortcuts are added. Once the number of added shortcuts passes the threshold of three, the interaction cost reduction becomes less significant. After five shortcuts have been added, the reduction in slope is almost negligible, indicating that the benefits of introducing additional shortcuts might not be worthwhile. Such data can be valuable in real-case scenarios, where intelligent systems (e.g., models) will be tasked with determining the value of adding or proposing new shortcuts to a user.

Additional Considerations

Although specific examples have been described, various modifications, alterations, alternative constructions, and equivalents are possible. Examples are not restricted to operation within certain specific data processing environments but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. An extended reality system comprising:
an extended reality device designed to be worn by a user and having a display to display content to the user in one or more extended reality environments;
one or more sensors to capture input data including images of a visual field of the user;
one or more processors; and
one or more memories accessible to the one or more processors, the one or more memories storing a plurality of instructions that are executable by the one or more processors to cause the one or more processors to perform processing comprising:
collecting a first set of personalized usage data of the user in the one or more extended reality environments over a period of time;
based on the first set of personalized usage data, estimating, by a predictive model, a plurality of interaction times for the user in the one or more extended reality environments, wherein each interaction time is associated with a corresponding functionality that has been used by the user over the period of time;
generating, by the predictive model, graphical user interface in the one or more extended reality environments, the graphical user interface including shortcuts based on the plurality of interaction times for the user; and
rendering the graphical user interface in the one or more extended reality environments to the user.

2. The extended reality system of claim 1, wherein the extended reality device is a head-mounted device selected from the group consisting of a mixed reality headset and augmented reality glasses.

3. The extended reality system of claim 1, wherein the first set of personalized usage data includes a first set of functionalities that have been used by the user over the period of time, and one or a combination of:
a type of each functionality in the set of functionalities;
a usage rate of each functionality in the set of functionalities;
a usage time of each functionality in the set of functionalities;
an environment associated with each functionality in the set of functionalities; and
a time to complete a task associated with one or more functionalities in the first set of functionalities;
and wherein the corresponding functionalities are functionalities of the first set of functionalities.

4. The extended reality system of claim 1, wherein estimating a plurality of interaction times is based on a computing time required to execute a functionality and a learning cost for the user to perform an interaction to trigger the functionality.

5. The extended reality system of claim 1, wherein the plurality of instructions when executed by the one or more processors cause the one or more processors to perform further processing comprising:
determining, by the predictive model, optimal shortcut assignments based on the first set of personalized usage data and the plurality of interaction times, wherein the optimal shortcut assignments assign shortcuts to execute functionalities in the one or more extended reality environments;
replacing the shortcuts with the optimal shortcut assignments; and
wherein generating the graphical user interface in the one or more extended reality environments includes:
generating, by the predictive model, an optimized graphical user interface in the one or more extended reality environments, the optimal shortcut assignments reflected in the optimized graphical user interface, and
using the optimized graphical user interface as the graphical user interface.

6. The extended reality system of claim 5, wherein the optimal shortcut assignments are determinable by the predictive model using a design space with a plurality of design dimensions and a plurality of design criteria.

7. The extended reality system of claim 6, wherein:
the plurality of design dimensions comprises visibility, agency, modality, availability, personalization, or a combination thereof; and
the plurality of design criteria comprises performance, convenience, memorability, attention overload, control, learning cost, or a combination thereof.

8. The extended reality system of claim 1, wherein the shortcuts comprise arm button shortcuts, gesture shortcuts, marking menu shortcuts, smart button shortcuts, user-defined automation shortcuts, or any combination thereof.

9. The extended reality system of claim 5, wherein the optimal shortcut assignments are a set of shortcuts associated with functionalities that minimize the estimated interaction time.

10. A computer-implemented method comprising:
receiving, by one or more processors, from one or more sensors of an extended reality designed to be worn by a user and having a display to display content to the user in one or more extended reality environments, input data including a visual field of the user;
collecting a first set of personalized usage data of the user in the one or more extended reality environments over a period of time;
estimating, by a predictive model, based on the first set of personalized usage data, a plurality of interaction times for the user in the one or more extended reality environments, wherein each interaction time is associated with a corresponding functionality that has been used by the user over the period of time;
generating, by the predictive model, a graphical user interface in the one or more extended reality environments, the graphical user interface including shortcuts based on the plurality of interaction times for the user; and
rendering the graphical user interface in the one or more extended reality environments to the user.

11. The computer-implemented method of claim 10, wherein the first set of personalized usage data includes a first set of functionalities that have been used by the user over the period of time, and one or a combination of:
a type of each functionality in the set of functionalities;
a usage rate of each functionality in the set of functionalities;
a usage time of each functionality in the set of functionalities;
an environment associated with each functionality in the set of functionalities; and
a time to complete a task associated with one or more functionalities in the first set of functionalities;
and wherein the corresponding functionalities are functionalities of the first set of functionalities.

12. The computer-implemented method of claim 10, further comprising:

determining, by the predictive model, optimal shortcut assignments based on the first set of personalized usage data and the plurality of interaction times, wherein the optimal shortcut assignments assign shortcuts to execute functionalities in the one or more extended reality environments;

replacing the shortcuts with the optimal shortcut assignments;

wherein generating the graphical user interface in the one or more extended reality environments includes:

generating, by the predictive model, an optimized graphical user interface in the one or more extended reality environments, the optimal shortcut assignments reflected in the optimized graphical user interface, and using the optimized graphical user interface as the graphical user interface;

prior to the collecting the first set of personalized usage data of the user, assigning shortcuts to execute functionalities using a predetermined rule; and updating the shortcuts using the optimal shortcut assignments determined by the predictive model.

13. The computer-implemented method of claim 10, further comprising:

collecting a second set of personalized usage data of the user in the one or more extended reality environments over a second period of time;

providing the second set of personalized usage data to the predictive model;

estimating, by the predictive model, a plurality of updated interaction times for the user in the one or more extended reality environments, where each interaction time is associated with a functionality in a second set of functionalities that are included in the second set of personalized usage data and have been used by the user over the second period of time;

determining, by the predictive model, adoption rate metrics associated with the shortcuts using the second set of personalized usage data;

determining, by the predictive model, updated optimal shortcut assignments based on the adoption rate metrics, the second set of personalized usage data, and the plurality of updated interaction times; and updating, by the predictive model, the graphical user interface based on the updated optimal shortcut assignments.

14. The computer-implemented method of claim 10, wherein a shortcut is updated when an adoption rate metric associated with the shortcut fails to meet a predetermined threshold.

15. The computer-implemented method of claim 10, further comprising:

suggesting one or more of the shortcuts to the user via the graphical user interface in the one or more extended reality environments; and updating the graphical user interface in the one or more extended reality environments based on user acceptance or rejection of the suggested one or more shortcuts.

16. A non-transitory computer-readable storage medium containing computer-readable instructions that, when executed by one or more processing systems, cause the one or more processing systems to perform operations comprising:

receiving, from one or more sensors of an extended reality device designed to be worn by a user and having a display to display content to the user in one or more extended reality environments, input data including a visual field of the user;

collecting a first set of personalized usage data of the user in the one or more extended reality environments over a period of time;

based on the first set of personalized usage data, estimating, by a predictive model, a plurality of interaction times for the user in the one or more extended reality environments, wherein each interaction time is associated with a corresponding functionality that has been used by the user over the period of time;

generating, by the predictive model, a graphical user interface in the one or more extended reality environments, the graphical user interface including shortcuts based on the plurality of interaction times for the user; and rendering the graphical user interface in the one or more extended reality environments to the user.

17. The non-transitory computer-readable medium of claim 16, wherein the first set of personalized usage data includes a first set of functionalities that have been used by the user over the period of time and one or a combination of:

a type of each functionality in the set of functionalities;

a usage rate of each functionality in the set of functionalities;

a usage time of each functionality in the set of functionalities;

an environment associated with each functionality in the set of functionalities; and a time to complete a task associated with one or more functionalities in the first set of functionalities;

and wherein the corresponding functionalities are functionalities of the first set of functionalities.

18. The non-transitory computer-readable medium of claim 16, wherein the computer-readable instructions, when executed by the one or more processing systems, further cause the one or more processing systems to perform operations comprising:

determining, by the predictive model, optimal shortcut assignments based on the first set of personalized usage data and the plurality of interaction times, wherein the optimal shortcut assignments assign shortcuts to execute functionalities in the one or more extended reality environments;

replacing the shortcuts with the optimal shortcut assignments; and wherein generating the graphical user interface in the one or more extended reality environments includes:

generating, by the predictive model, an optimized graphical user interface in the one or more extended reality environments, the optimal shortcut assignments reflected in the optimized graphical user interface, and using the optimized graphical user interface as the graphical user interface.

19. The non-transitory computer-readable medium of claim 18, wherein:

estimating a plurality of interaction times is based on a computing time required to execute a functionality and a learning cost for the user to perform an interaction to trigger the functionality;

the optimal shortcut assignments are a set of shortcuts associated with functionalities that minimize the estimated interaction time; and the optimal shortcut assignments are determinable by the predictive model using a design space with a plurality of design dimensions and a plurality of design criteria.

20. The non-transitory computer-readable medium of claim 18, wherein:
the design dimensions comprise visibility, agency, modality, availability, personalization, or a combination thereof; and
the design criteria comprise performance, convenience, memorability, attention overload, control, learning cost, or a combination thereof.

\* \* \* \* \*